United States Patent
Kashino et al.

(10) Patent No.: US 7,490,107 B2
(45) Date of Patent: Feb. 10, 2009

(54) INFORMATION SEARCH METHOD AND APPARATUS OF TIME-SERIES DATA USING MULTI-DIMENSIONAL TIME-SERIES FEATURE VECTOR AND PROGRAM STORAGE MEDIUM

(75) Inventors: Kunio Kashino, Tokyo (JP); Takayuki Kurozumi, Zama (JP); Hiroshi Murase, Atsugi (JP)

(73) Assignee: Nippon Telegraph & Telephone Corporation, Tokyo (JP)

( * ) Notice: Subject to any disclaimer, the term of this patent is extended or adjusted under 35 U.S.C. 154(b) by 225 days.

(21) Appl. No.: 09/860,415

(22) Filed: May 18, 2001

(65) Prior Publication Data
US 2001/0049664 A1    Dec. 6, 2001

(30) Foreign Application Priority Data
May 19, 2000    (JP)    ............................. 2000-149047

(51) Int. Cl.
G06F 17/30    (2006.01)
(52) U.S. Cl. .......................................... 707/200; 707/3
(58) Field of Classification Search ...................... 707/1, 707/5, 6, 10, 100, 102–104.1; 370/310, 335–337, 370/345, 347, 223–226; 700/1, 83; 709/200–204, 709/217–219, 223–226; 715/700, 762, 810
See application file for complete search history.

(56) References Cited

U.S. PATENT DOCUMENTS 5,121,428 A * 6/1992 Uchiyama et al. ........... 704/243
5,426,281 A * 6/1995 Abecassis ................... 235/379
5,430,690 A * 7/1995 Abel .......................... 367/135
5,519,861 A * 5/1996 Ryu et al. ...................... 707/1
5,636,128 A * 6/1997 Sugimoto et al. ............. 702/70

(Continued)

FOREIGN PATENT DOCUMENTS

EP    0 971 296    7/1999

(Continued)

OTHER PUBLICATIONS

T. Kurozumi et al, "Quick Audio Searching for a Query Music Signal Received with Portable Phones", Proceedings of the 2001 IEICE general conference, D-12-57, p. 224, Mar. 26, 2001, article was finished in Japanese with no English Translation.

(Continued)

*Primary Examiner*—Debbie M Le
(74) *Attorney, Agent, or Firm*—Nixon Peabody LLP

(57) ABSTRACT

It enables easy and quick searching and delivery of information desired by a user based upon a portion of time-series data which consists of clip information from music, a movie, a commercial message, or the like. The user accesses an information search server from a user terminal which is connected to a network, and, using this portion of time-series data as a search key, performs searches upon said server for information related to the time-series data. The information search server returns the name of the tune, the title of the movie, the name of goods advertised in the commercial message or the like to the user terminal via said network as search results, and the search provider levies a price for said search from the user.

44 Claims, 24 Drawing Sheets

U.S. PATENT DOCUMENTS

| | | | |
|---|---|---|---|
| 5,713,021 A | 1/1998 | Kondo et al. | 707/103 R |
| 5,734,893 A * | 3/1998 | Li et al. | 707/4 |
| 5,918,223 A | 6/1999 | Blum et al. | |
| 5,940,796 A * | 8/1999 | Matsumoto | 704/260 |
| 6,272,543 B1 * | 8/2001 | Nozawa et al. | 709/226 |
| 6,282,548 B1 * | 8/2001 | Burner et al. | 707/104.1 |
| 6,327,574 B1 * | 12/2001 | Kramer et al. | 705/14 |
| 6,366,914 B1 * | 4/2002 | Stern | 707/10 |
| 6,400,996 B1 * | 6/2002 | Hoffberg et al. | 700/83 |
| 6,466,516 B1 * | 10/2002 | O'Brien et al. | 367/131 |
| 6,466,731 B2 | 10/2002 | Aoki et al. | 386/46 |
| 6,658,568 B1 * | 12/2003 | Ginter et al. | 713/193 |
| 6,748,367 B1 * | 6/2004 | Lee | 705/66 |
| 6,976,053 B1 * | 12/2005 | Tripp et al. | 709/202 |
| 7,016,870 B1 * | 3/2006 | Jones et al. | 705/35 |
| 2001/0025259 A1 * | 9/2001 | Rouchon | 705/26 |
| 2001/0033244 A1 * | 10/2001 | Harris et al. | 341/176 |
| 2002/0071649 A1 | 6/2002 | Aoki et al. | 386/8 |

FOREIGN PATENT DOCUMENTS

| | | |
|---|---|---|
| JP | 06-290574 | 10/1994 |
| JP | 09-016457 | 1/1997 |
| JP | 09/237343 | 9/1997 |
| JP | 09-270006 | 10/1997 |
| JP | 10-154149 | 6/1998 |
| JP | 11-120198 | 4/1999 |
| JP | 11-282857 | 10/1999 |
| JP | 2000-010989 | 1/2000 |
| JP | 2000-112975 | 4/2000 |
| JP | 3065314 | 5/2000 |

OTHER PUBLICATIONS

Kunio Kashino, "Quick Audio and Video Retrieval Using Multimodal Active Search", Institute of Electronics, Information and Communication Engineers, 1998, pp. 51-58.

Kunio Kashino, "A Quick Algorithm for Acoustic Signals Using Histogram Features Time-Series Active Search", 1999, D-II vol. J82-D-II No. 9, pp. 1365-1373.

* cited by examiner

FIG. 6

SEARCH RESULTS

ONE SIMILAR ITEM FOUND

ABC TELEPHONE COMPANY TELEVISION COMMERCIAL:
  COMMERCIAL RELATED TO LONG DISTANCE CALL DISCOUNT

RELATED URL: http://www.abc-com.com/

GOODS PURCHASE INFORMATION:
  DISCOUNT SERVICE SUBSCRIPTION FORM

PLEASE ENTER TELEPHONE NUMBER:

[    ] — [    ] — [    ]

DATE FOR COMMENCEMENT OF SERVICE

[    ] MONTH [    ] DAY [    ] YEAR

INFORMATION SEARCH METHOD AND APPARATUS OF TIME-SERIES DATA USING MULTI-DIMENSIONAL TIME-SERIES FEATURE VECTOR AND PROGRAM STORAGE MEDIUM

BACKGROUND OF THE INVENTION

1. Field of the Invention

The present invention relates to an information search system which searches out a piece of concrete media information which a user has specified by a search key, from a database in which are accumulated items of information (hereinafter termed "accompanying information") accompanying time-series data, such as music related information, singer related information, or goods information related to time-series data recorded upon a CD (compact disk) or the like, and delivers the information to the user; and more particularly relates to an information search apparatus which utilizes the system and to an information search server which utilizes the apparatus. Furthermore, the present invention relates to an information search method, to a program which implements the method, and to a storage medium upon which the program is stored.

2. Description of the Related Art

Conventionally, searches have been performed in databases in which are accumulated items of information accompanying time-series data determined in advance, such as, for example, singer related information or goods information related to music which consists of time-series data recorded upon a CD or the like. As information search methods used in such cases, there are per se known information search methods in which character strings, numbers, and symbols are used as search keys, and methods in which the user selects from among options which are determined in advance.

However, with information search methods according to the above described related arts, there is the deficiency that it is difficult for the user to perform an effective search if he is not aware of character string information, numerical information, or symbolic information corresponding to the information in question, or if it is difficult for him to make a selection from the options which have been determined in advance, and accordingly the effectiveness of business schemes in which information is delivered using such information search methods has been limited.

For example, with methods for delivery of a search service which utilize information search methods according to such related art, it has not been possible to perform delivery of a search service having adequate efficiency, (1) if it is desired to search out information related to music of which the name of the tune is not known by using a snatch of music; or (2) if it is desired to search out information related to a movie of which the title is not known by using a clip of video; or (3) if it is desired to search out detailed information for goods to which a commercial message relates by using a clip from the commercial message as a search key.

SUMMARY OF THE INVENTION

The present invention has been made in order to overcome the above described problems with the related art, and its objective is to propose an information search apparatus which is utilized by an information search system for easily and moreover quickly searching out and delivering information which a user wishes to know based upon a portion of time-series data which is a fragment of information such as a snatch of music or a clip from a movie or a commercial. It is also an objective of the present information to propose an information search server which utilizes this information search apparatus; and further to propose a relevant information search method, a program which implements the method, and a storage medium upon which the program is stored.

With the information search method and apparatus according to the present invention, accompanying information which is associated with the time-series data is accumulated in advance, and a search is performed through said accompanying information which has been accumulated in advance based upon at least one of time-series data which is input from the user's terminal and search time-series signal feature data representing said time-series data, and then the accompanying information is outputted.

In concrete terms, the time-series signal feature data for which comparison with the search time-series signal feature data is to be performed are accumulated in advance, and, when said time-series data is received, search time-series signal feature data which represents said time-series data are calculated based upon the received time-series data, said search time-series signal feature data are searched for within said time-series signal feature data which have been accumulated in advance, and said accompanying information which was accumulated in advance is selected based upon the results of this search and is outputted.

Further, the present invention proposes a program for implementing upon a computer processing which corresponds to the above described information search, and a storage medium, capable of being read by a computer, on which said program is stored.

According to the present invention, it is possible easily and also quickly to search out and to deliver to the user the information which the user desires, by searching in the accumulated information based upon a fragment of a sound (or audio) signal or an image signal (which includes video images or still images), utilizing an information search method which searches for information related to the time-series data by taking as a search key the portion of time-series data which is information describing a snatch of music, a clip from a movie, or a clip from a commercial message or the like. Further, it is possible to implement a business function of obtaining payment from the user, an information provider, or a line provider.

BRIEF DESCRIPTION OF THE DRAWINGS

FIG. 6 is an explanatory figure showing an example of display of search results in web page format as transmitted from the information search apparatus according to this first preferred embodiment.

DETAILED DESCRIPTION OF THE PREFERRED EMBODIMENTS

Although in the following various preferred embodiments of the present invention will be described with reference to the appended drawings, it should be understood that the present invention is not limited by the embodiments explained below, or by the drawings: for example, it would be possible to combine various ones of the features of these shown preferred embodiments, as appropriate.

Embodiment 1

Figure 1:
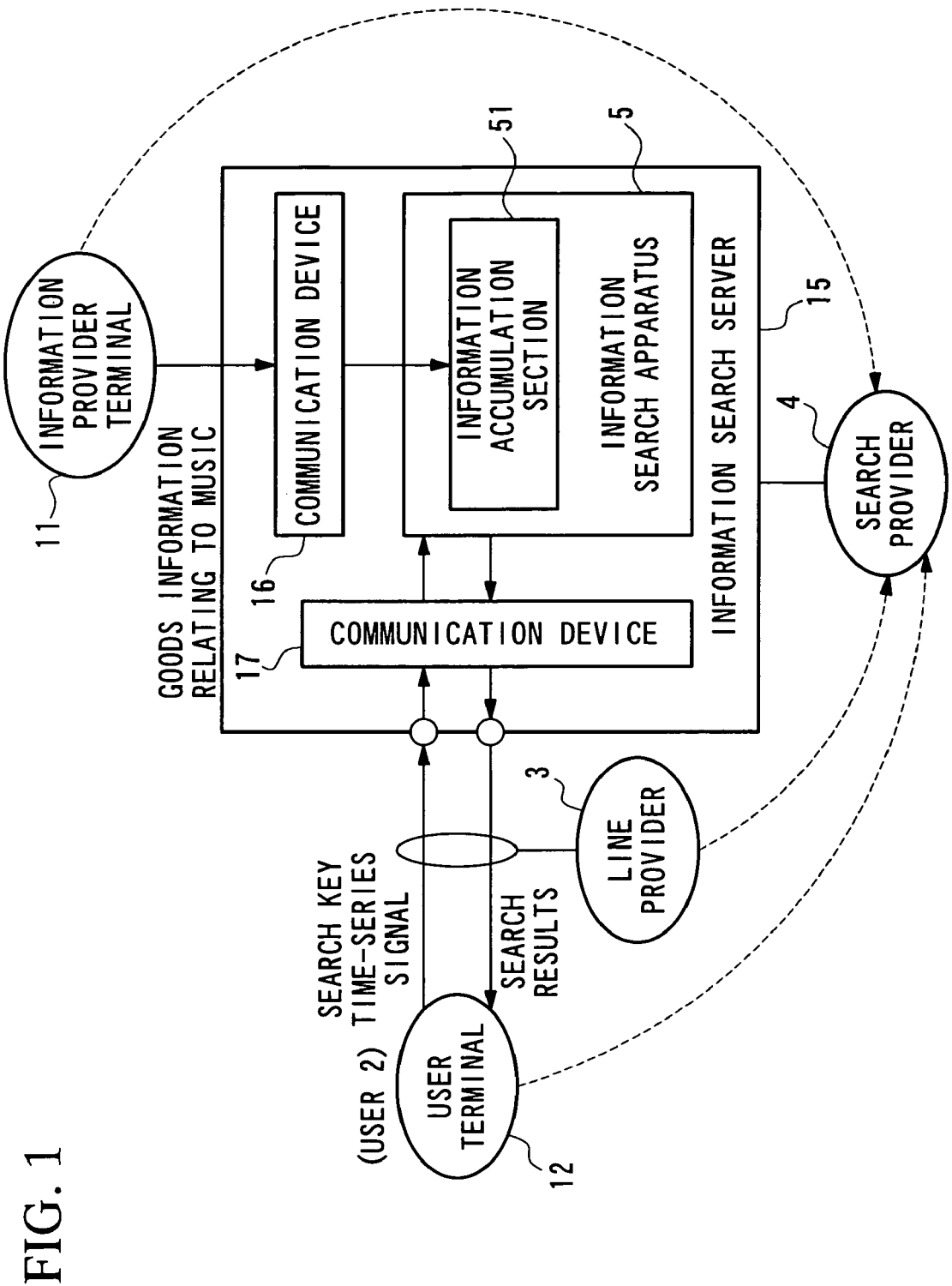
FIG. 1 is a block diagram showing the structure of an information search system according to a first preferred embodiment of the present invention.

In this first preferred embodiment, a basic information search system will be described. FIG. 1 is a block diagram showing an example of the structure of an information search system according to the first preferred embodiment of the present invention. This information search system comprises an information provider terminal 11 which is owned by an information provider (sponsor) 1, a user terminal 12 which belongs to a user 2, a line provider 3, a search provider 4, and an information search server 15 which is provided by the search provider 4. And, if for example music information is taken as the subject of search, this information search system is utilized for the business scheme of delivering the music information which has been searched out to the user terminal 12 of the user 2. Or, if it is supposed that this business scheme is applied to an auction which is implemented upon a computer network, the organizer of the auction corresponds to the search provider 4, the person who consigns goods to the auction corresponds to the information provider 1, and the person who desires to purchase goods via the auction corresponds to the user 2.

Various devices may be considered for the user terminal 12, such as mobile telephones like portable telephones or PHS (registered trademark) (personal handy-phone system) telephones, or portable terminals like PDAs (Personal Digital Assistants), or computers like personal computers or workstations, etc.. In other words, any device may be employed as the user terminal 12, provided that it is endowed with the function of sending time-series data to the information search server 15. Further, the information provider terminal 11 is a computer such as a personal computer or a workstation, and any device may be employed as the information provider terminal 11, provided that it is endowed with the function of providing information for the information search server 15.

Here, in this specification, in general, the term "time-series data" means information which can be replayed by the replay device in question. For example, in the case of music, it means data which represents music, such as analog data, data recorded upon a CD, data in a WAV file, or data in a MP3 (MPEG-1 Audio Layer III) file, or the like. Further, in the case of a video image, it means data which represents a video image, such as analog data or digital data like MPEG-2 (Moving Picture Experts Group-2) data or the like. Accordingly, in the case of music, the search key which is used for searching the information may be information such as a short phrase in a tune (i.e. a snatch of music), while in the case of a video image it may be a single scene, a short segment, or a single shot from a movie (i.e. a clip video image). Of course, although in view of business considerations video images (moving pictures) are the main subject, it should be understood that still images (still pictures) could equally well be searched.

The information search server 15 comprises communication devices 16 and 17 for respectively performing communication between the information provider terminal 11 and the user terminal 12, and an information search apparatus 5. It should be understood that, to speak accurately, this is a type of program (process) which operates in the background upon a computer such as a workstation or the like. However, considering the software which includes such a program and the hardware of the computer upon which it runs together as a functional unit, they may collectively be termed a "server".

Thus, in this specification, the entire device (including both software and hardware) which offers a service to the user 2 is termed the "server". Further, in FIG. 1, the broken lines to which the arrows are affixed denote the flow of certain payments which constitute the prices for the searches which are offered. Yet further, although in FIG. 1 the communication device is separated into a section 17 for the use of the user and a section 16 for the use of the information provider, for the convenience of explanation of the transmission and receipt of various items of information by the information provider terminal 11 and the user terminal 12, in actual fact it is usual to implement these functions in a single unified communications device.

Figure 2:
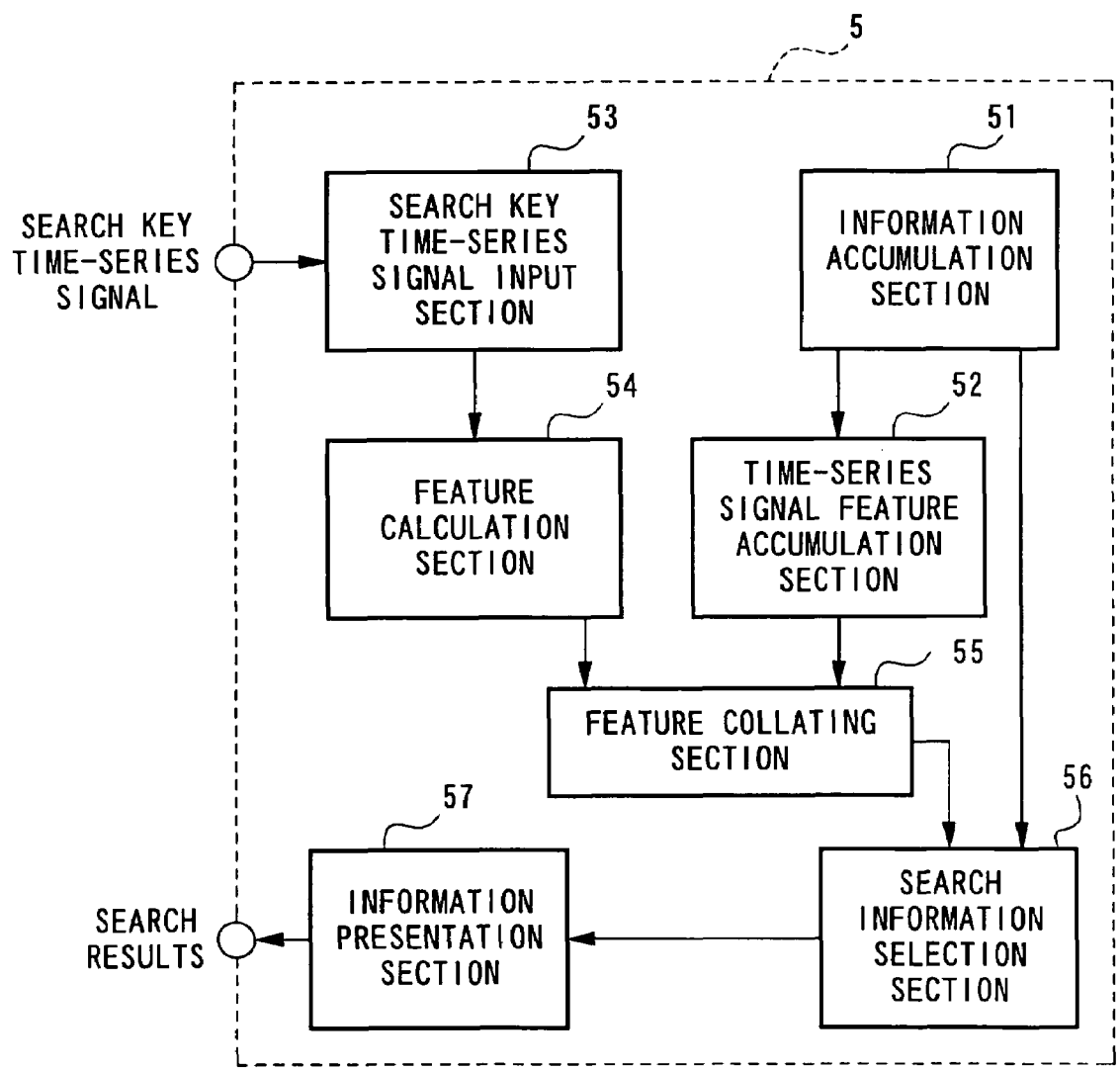
FIG. 2 is a block diagram showing the structure of an information search apparatus according to this first preferred embodiment.

Next, the structure of the information search apparatus 5 will be described in detail. FIG. 2 is a block diagram showing the structure of the information search apparatus (which corresponds to the information search apparatus 5 of FIG. 1) according to this first preferred embodiment of the present invention. This information search apparatus 5 comprises an information accumulation section 51, a time-series signal feature accumulation section 52, a search key time-series signal input section 53, a feature calculation section 54, a feature collating section 55, a search information selection section 56, and an information presentation section 57; and it inputs the portion of time-series data which the user desires to use as a search key (for example, a sound signal), and outputs the information which has been searched for. It should be understood that the functions of each of the sections described above which are comprised in this information search apparatus 5 will be described in detail hereinafter.

Next, the operation of the information search server 15 of this first preferred embodiment will be described. The information provider 1 shown in FIG. 1 calculates feature data (hereinafter termed "time-series signal feature data") from time-series data consisting of at least one of music or video images recorded in a television program, a radio program, a movie, or a CD, by using the same method as the calculation method for feature data which will be described hereinafter, and supplies this data to the search provider 4, to be accumulated in advance in the time-series signal feature accumulation section 52 which is included in the information search apparatus 5 (refer to FIG. 2). In addition, the information provider 1 offers information which may be considered helpful to the user 2 to the search provider 4, as accompanying information which corresponds to the time-series signal feature data which has been calculated, and this is accumulated in advance in the information accumulation section 51 which is included in the information search apparatus 5.

This accompanying information which is accumulated in the information accumulation section 51 may be, for example, the title of a program, the title of a tune which is used, the name of a performer, the title of another tune by the performer, or, for a CD or related goods or the like which is on sale, the goods number or method of ordering; and these items of information are accumulated in relation with the time-series signal feature data. Or, if the music or the video image can be obtained upon the web, the URL (Uniform Resource Locator) of a file in which this music or video image is stored, or the URL of a website where information relating to the contents of this music or video image is published, or the name of the performer or artist, may serve as the accompanying information; or, if the music or video image relates to a commercial message, an order form for purchasing the goods in question may likewise serve.

Per se known techniques related to database management may be utilized as the technical methods for this accumulation of information. It should be noted that the clusters of information which have been accumulated will be hereinafter referred to in this specification as "information units". Relationships are established for the accompanying information according to these information units. It should be noted that, in this first preferred embodiment, by way of example, the case will be explained of the subject searched by the user 2 being music which is recorded upon a CD, and the information unit being a single tune.

Next, the user 2 captures with a portable terminal or the like a piece of music (for example, background music streaming during a radio program or in a shop) which he has encountered in a car, in a shop, or during a television program or the like, or a song presented upon a television program, and, transmits this sound signal or video image signal which has been captured as a search key from the user terminal 12 to the information search server 15 via a communication line provided by the line provider 3, such as a portable telephone or the like.

Figure 3:
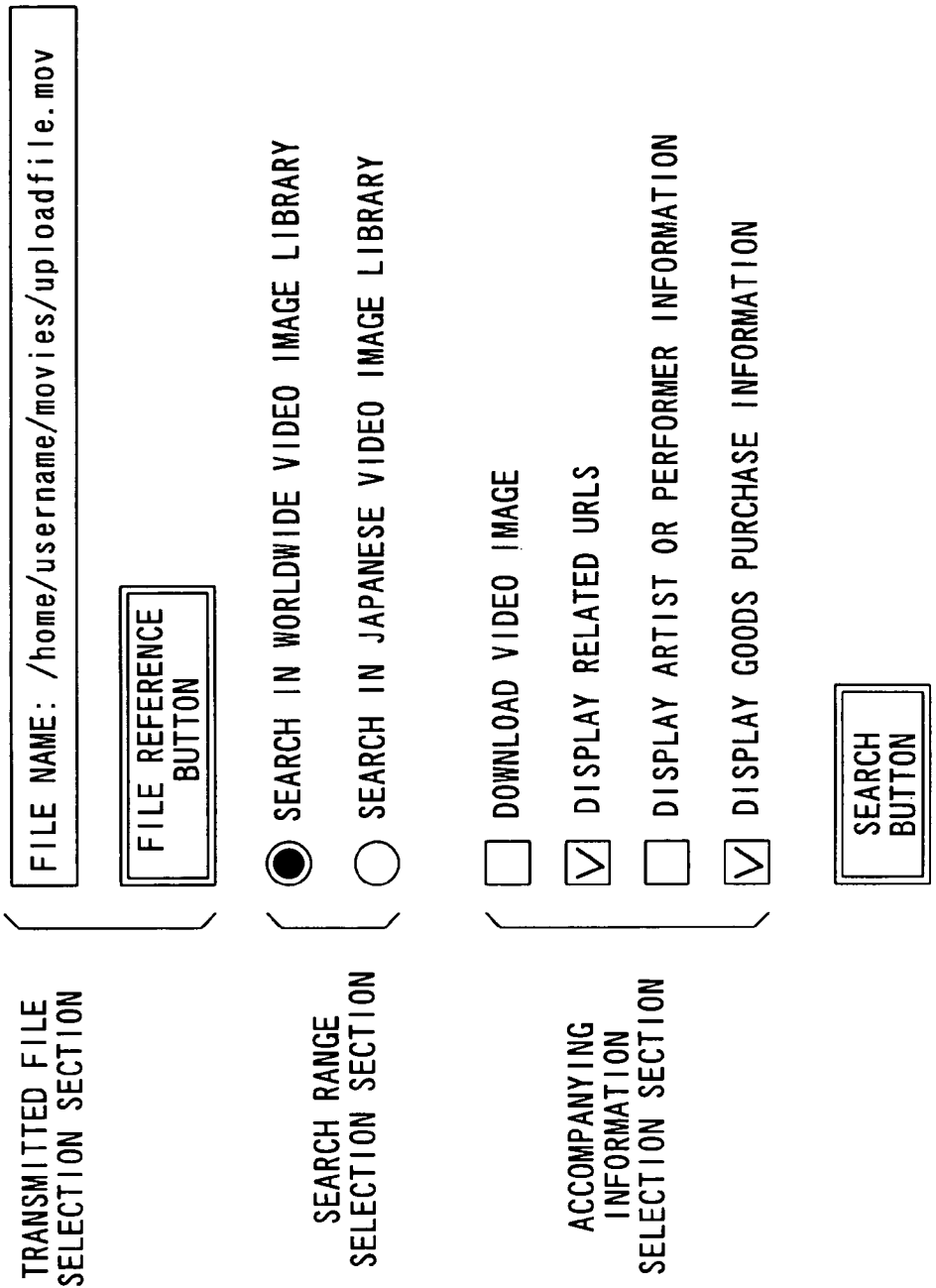
FIG. 3 is an explanatory figure showing an example of a web page which is displayed to a user in order for him to perform an information search, with this first preferred embodiment.

Apart from the methods which have been described above for the user 2 to transmit the search key to the information search server 15, the procedure of sending it via a web page should also be considered. In this case, the user 2 accesses a web page (a home page) which is provided by the search provider 4 via the user terminal 12, and uploads the search key to the information search server 15. FIG. 3 shows an example of a web page which is provided upon the information search server 15 for the user 2 to perform an information search related to a video image. It should be understood that, although this figure relates to the case of a video image signal, the display in the case of searching accompanying information which is related to music (a sound signal) upon a CD, as hypothesized herein, is almost identical The web page shown in FIG. 3 includes a transmitted file selection section, a search range selection section, an accompanying information selection section, and a search button. The transmitted file selection section is for selecting the file which is to be transmitted to the information search server 15 from among the video image files which have been stored in advance upon the user terminal 12 (for example, video images which have been captured from broadcast television programs), and consists of a field for inputting a file name and a file reference button. In the file name input field, the name of a file such as a movie file or the like which is stored upon the user terminal 12 may be inputted. Further, the file reference button is a button for the user 2 to select a file which is stored upon the user terminal 12 rather than by inputting the file name.

It should be understood that the movie file may be made by a per se known method of digitizing a video image signal in which a video image from a television program (for example) has been recorded and by capturing the result upon a computer, either in its entirety or by clipping a portion thereof. Further, although in FIG. 3 the path name is shown as being in the standard UNIX format (this is a trademark of AT&T Bell Labs), it could also, for example, be in the MS-Windows (this is a registered trademark of Microsoft Inc.) format, like "C:\My Documents\movies\uploadfile.mov", or the like. Moreover, instead of the user 2 inputting a file name, it would also be acceptable to implement a system in which he designates a file by dragging an icon for the file which is present upon the desktop of the computer, for example, and dropping it upon the file name input field.

The search range selection section is for the user 2 to designate a search range which is to be the subject of being searched by the information search server 15, and, for example, may consist of a radio button for designating searching from a worldwide video image library, and a radio button for designating searching from a Japanese video image library.

The accompanying information selection section is for designating the details of the search results which are to be transmitted from the information search server 15, and the user 2 can select any of four check boxes. Among these check boxes, "Download Video Image" is for downloading to the user terminal 12 the entire video image which includes the search key; "Display Related URLs" is for displaying on the screen of the user terminal 12 the locations upon the internet where files for the video image which has been searched for are registered; "Display Artist or Performer Information" is for displaying information such as, for example, the name of a producer or an actor related to a commercial message which has been searched for; and "Display Goods Purchase Information" is for displaying upon the screen of the user terminal 12, for example, price and purchase procedures for a video disk (laser disk) or a DVD (Digital Versatile Disk) upon which the movie is stored.

And the user 2 inputs the information or performs the selection, as required by each section of this web page, and clicks the search button, and the search key is then transmitted from the user terminal 12 to the information search server 15.

The information search server 15 receives the search key (the snatch of music) which has been transmitted from the user terminal 12 via the communication device 17, and inputs it to the information search apparatus 5. The information search apparatus 5 searches through the accompanying information which has been accumulated in the information accumulation section 51 by using this snatch of music which has been transmitted from the user terminal 12 as a search key, selects matching items of accompanying information, and transmits them to the user terminal 12 via the communication device 17 and the communication line. By doing this, the searched out accompanying information is presented to the user 2 via his user terminal 12.

Figure 4:
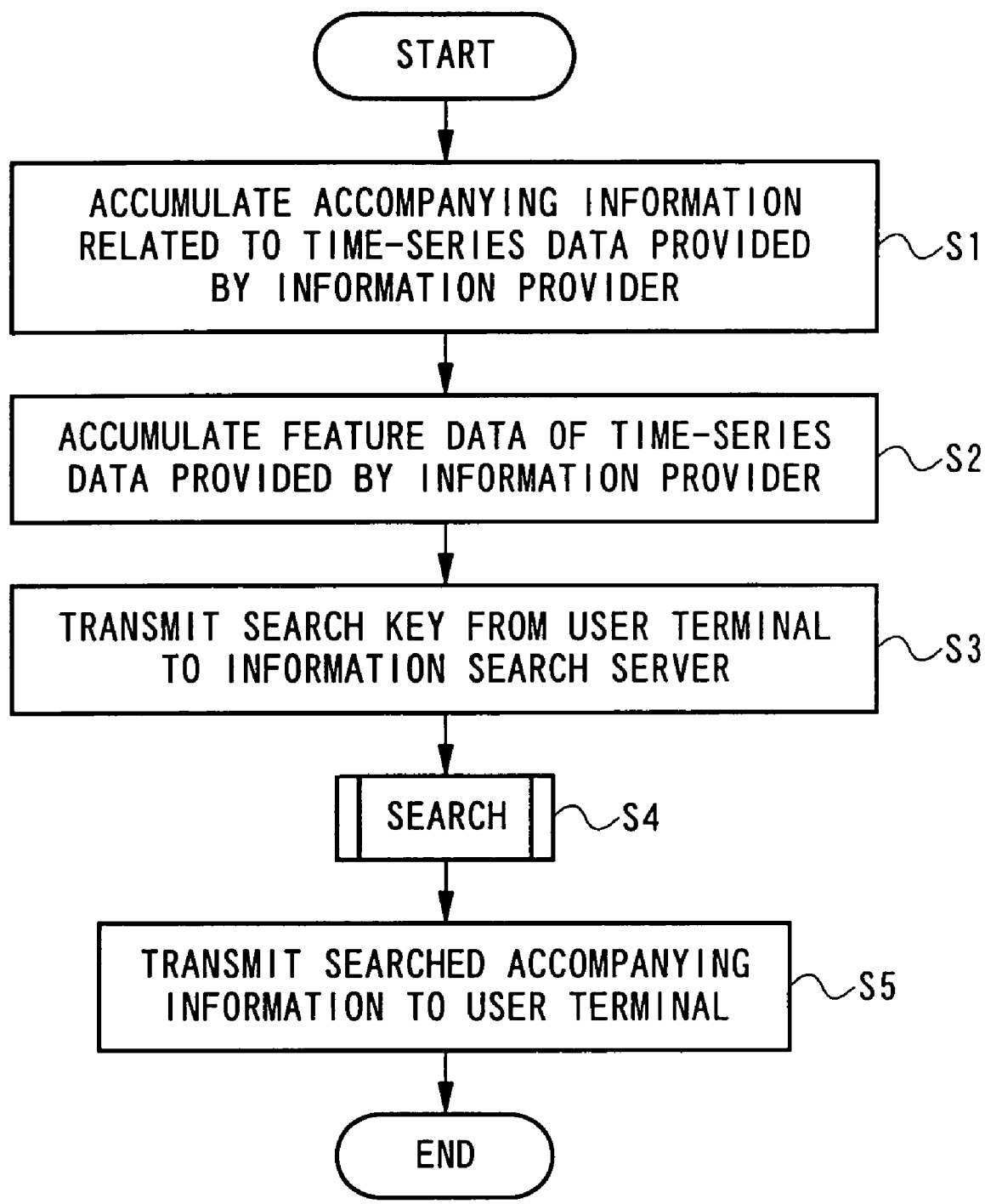
FIG. 4 is a flow chart showing the operation of an information search method according to this first preferred embodiment.
Figure 5:
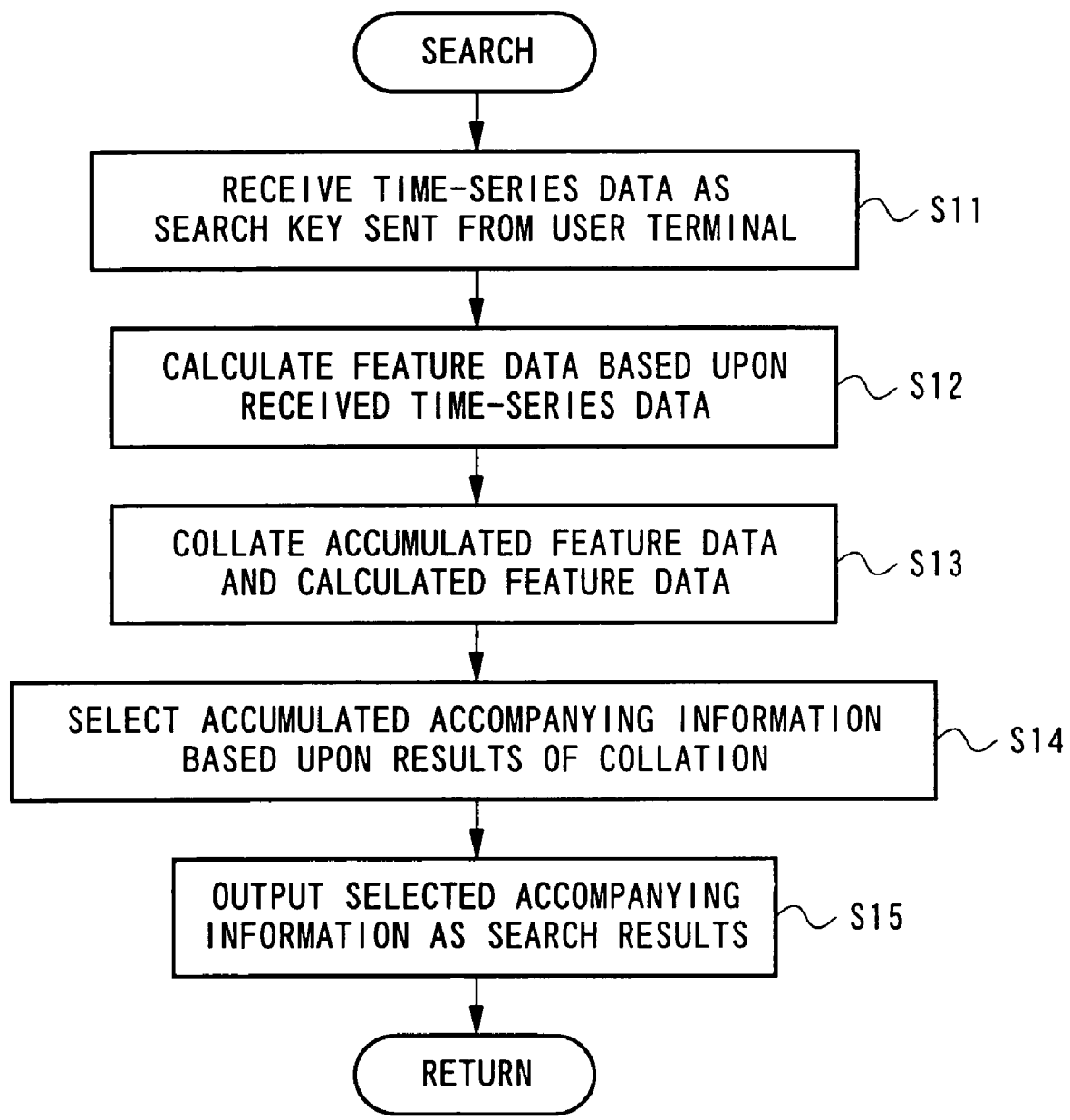
FIG. 5 is a flow chart showing the concrete details of a search procedure included in the procedure shown in FIG. 4.

Next, FIG. 4 is a flow chart showing the operation of an information search method which is performed by the information search server 15 according to this first preferred embodiment. Further, FIG. 5 is a detailed flow chart showing the concrete details of a search procedure which is included in the procedure shown in FIG. 4.

First, in a step S1, the information provider 1 furnishes the accompanying information which is to be the subject of searching to the search provider 4, and the search provider 4 gives this accompanying information to the information search server 15 and it is accumulated in the information accumulation section 51. Further, in a step S2, the information provider 1 produces the feature data presented by the time-series signals which are respectively related to the items of accompanying information which are accumulated in the information accumulation section 51 and furnishes this data to the search provider 4, and the search provider 4 accumulates this feature data in the time-series signal feature accumulation section 52. It should be noted that the order of the procedures which are performed in these steps S1 and S2 could be reversed. Next, the user 2 operates the user terminal 12, and transmits time-series data as a search key to the information search server 15. In a step S3, the information search server 15 receives the search key which has been transmitted and inputs it to the information search apparatus 5. In a step S4, the information search apparatus 5 searches through the accompanying information which has been accumulated based upon the search key which has been transmitted, and outputs the accompanying information which has been searched out as the search results. And in a step S5 the information search server 15 transmits the search results which are output from the information search apparatus 5 to the user terminal 12.

The search in the above described step S4 is performed in the following manner. Namely, in a step S11 (the search feature time-series signal reception process), the search key time-series signal input section 53 receives the time-series signal (the partial or entire time-series data for a portion or the entirety of the tune which the information search server 15 has received from the user terminal 12, hereinafter termed the "search key time-series signal") which is to constitute the search key for searching for the information in question, and inputs it to the feature calculation section 54. Next, in a step S12, the feature calculation section 54 calculates from the search key time-series signal the features (hereinafter termed the "search time-series signal feature data") which the search key time-series signal presents, and outputs them to the feature collating section 55. And then in a step S13 (the feature collation process), the feature collating section 55 collates parts or the entirety of the features (hereinafter termed the "time-series signal feature data") which have been accumulated in the time-series signal feature accumulation section 52, one information unit at a time, with parts or the entirety of the search time-series signal feature data which have been obtained from the feature calculation section 54, and extracts from among the information which has been accumulated in the time-series signal feature accumulation section 52 the portions which resemble the search time-series signal feature data. In this manner, the extraction of similar portions is performed by feature collation. And in the step S14 (the search results production process), the search information selection section 56 selects the accompanying information for which relationship has been established with the information units which include these similar portions, from among the accompanying information which is accumulated in the information accumulation section 51, based upon the results of collation by the feature collating section 55. In this manner, in the similar portion extraction procedure, a collation is made one information unit at a time between the search time-series signal feature data and the time-series signal feature data which have been calculated in advance by the identical feature calculation method and have been accumulated, and the portions thereof which resemble the search time-series signal feature data are extracted from the time-series signal feature accumulation section 52. Next in a step S15 (the search results transmission process), based upon the search information selection results from the search information selection section 56, the information presentation section 57 transmits the accompanying information which constitutes the search results to the user terminal 12.

Next, the various functional blocks within the information search apparatus 5 will be described in detail. In the information accumulation section 51 there is accumulated information for music information which is to be the subject of search which is considered to be helpful by the user 2, or by a party to the implementation of this preferred embodiment (the information provider 1, the line provider 3, or the search provider 4).

The time-series signal feature accumulation section 52 accumulates sound signal features which correspond to the information units of accompanying information which have been accumulated in the information accumulation section 51. A concrete method for obtaining these sound signal features is as follows. First, a music signal (time-series data) is prepared corresponding to each information unit of accompanying information which has been accumulated in the information accumulation section 51. Next, feature extraction is performed for this music signal by the same method as performed by the feature calculation section 54. Although various different methods can be conceived of for such feature extraction, as a concrete example thereof, the following method of implementation by band pass filters may be proposed.

In detail, if for example seven band pass filters are used, their central frequencies are set at equal intervals upon a logarithmic frequency axis, and the mean square value of the output of each band pass filter in an analysis window 60 milliseconds long is calculated while shifting the analysis window by 10 milliseconds at a time, so that the seven values which are obtained, as a group, constitute a seven dimensional feature vector. Good distinctive sound feature extraction results are obtained by using the feature vector obtained in this manner. Moreover, in this case one feature vector can be obtained every ten milliseconds. The time-series signal feature accumulation section 52 accumulates a time-series of feature vectors which have been calculated over time in this manner as time-series signal feature data in the information accumulation section 51 while establishing correspondence with each information unit of accompanying information.

Moreover, the information search apparatus 5 of this first preferred embodiment is also able to utilize video images as search keys for searching by using video image features. In this connection, in addition, a concrete example of feature extraction technique for the case in which the time-series data represents a video image will also be explained. In this case, based upon time-series data for the video image, for example a video image of one frame is cut up into four equal sections horizontally and three equal sections vertically so as to be subdivided into a total of twelve regions, and average picture element values are calculated within each of these regions for the picture elements of each of the three RGB primary colors. The thirty-six dimensional vector which is made up from these averaged RGB picture element values for the twelve regions obtained in this manner is used as the feature vector. Good results for extracting video image features can be obtained by using feature vectors generated in this manner.

Next, the search key time-series signal input section 53 accepts, via the communication device 17, the snatch of music signal which is designated by the user to be used as the search key and stores it. For example, if the user has specified a search key using a mobile telephone, what happens is that the search key time-series input section 53 receives and processes the sound signal which is transmitted from the mobile telephone, executes processing for cutting out the music portion intended by the user 2 from the received sound signal (a portion or the entirety of the time-series data), and executes processing for storing the music portion and for outputting the music signal to the feature calculation section 54.

Next, the feature calculation section 54 first reads in the music signal which has been output from the search key time-series signal input section 53, and then performs extraction of the feature vector which corresponds to the music signal. This extraction of the feature vector is performed in the same manner as when calculating the time-series signal feature data which is accumulated in the time-series signal feature accumulation section 52 from the time-series data.

The feature collating section 55 first reads in the time-series of the feature vector (the search time-series signal feature data) which has been output from the feature calculation section 54, and then constructs a histogram from these feature vectors. This histogram may be made, for example, by dividing the range of values which each element of the feature vector assumes into a number of bins. For example, if the range of the values which each element assumes is divided into three bins, and the number of elements of each feature vector is seven, then the total number of bins (i.e. the number of bins arranged along the horizontal axis of the histogram) is $3^7$. Accordingly, the feature vector histogram can be produced by classifying each feature vector into one or the other of these $3^7$ bins, and by counting the number of feature vectors for each of these groups.

Next, the feature collating section 55 reads in the information units which correspond to each of the feature vectors (the time-series signal feature data) which have been output from the time-series signal feature accumulation section 52. The feature collating section 55 sets, for the feature vector time-series of each of these information units, an attention window of the same time duration as the time-series of the feature vector which has been output from the feature calculation section 54, and constructs a feature vector histogram in the same manner as the above search time-series signal feature data for the feature vectors in this attention window.

Next, the feature collating section 55 calculates the degree of similarity between the histogram of the feature vectors which have been transmitted from the time-series signal feature accumulation section 52 (hereinafter termed the "histogram HR of the reference signal") and the histogram of the feature vectors which have been transmitted from the feature calculation section 54 (hereinafter termed the histogram HI of the input signal). The degree of similarity SRI between the histogram HR of the reference signal and the histogram HI of the input signal is defined as follows:

$$S_{RI} = \frac{1}{D}\sum_{l=1}^{L} \min(h_{Rl}, h_{Il})$$

Here, L is the total number of bins of the histograms (in the above example, $3^7$); D is the total number of frequencies in the histograms, and $h_{Rl}$ and $h_{Il}$ are the number of feature vectors (the number of frequencies) contained in the l-th bins of the histograms HR and HI respectively. Further, min ($h_{Rl}$, $h_{Il}$) is a function which determines the lesser valued one of $h_{Rl}$ and $h_r$.

If the value of the degree of similarity SRI is greater than a value set in advance, then this indicates that, for the present attention window position for the present information unit, the signal (the time-series data) which has been input as a search key sufficiently resembles the signal (the time-series data) which was the origin of the time-series signal feature data which is being read out from the time-series signal feature accumulation section 52. Thus, taking the present information unit as being the search information, the information which designates the present information unit (for example, the information unit number which is assigned to each information unit) is output to the search information selection section 56.

On the other hand, if the value of the degree of similarity SRI is less than or equal to the value set in advance, then the attention window is shifted, and the search continues for the present information unit. If the result is that the attention window reaches the end point of the time-series signal which corresponds to the present information unit, then a search is performed in the same manner for feature time-series (time-series signal feature data) corresponding to the unsearched information units.

In addition, the feature collating process can also be performed, for example, by comparing feature vectors directly. Accordingly, a concrete example will be explained when time-series data represents video image signals. In this case, first, a high dimensional feature vector is derived which develops the feature vectors of the search time-series signal feature data. If for example the search time-series signal feature data is 150 frames of video, then a high dimensional feature vector of 5400 dimensions (=36×150) is obtained. This high dimensional feature vector is collated with a high dimensional vector which has been obtained from a feature vector accumulated in the time-series signal feature accumulation section 52 (i.e., a high dimensional feature vector which has been obtained by developing a feature vector by multiplying the time-series signal feature data by a collation window of the same length as the number of frames of the search time-series signal feature data). This collation is performed by obtaining the Euclidean distance between these two high dimensional vectors. And the Euclidean distance is calculated while shifting the collation window provided in the time-series signal feature data by one frame at a time, and the portion for which the Euclidean distance is the shortest is taken as the similar portion detection result.

Next, the search information selection section 56 first reads in the information unit number (in other words, information which designates the information unit which is being searched) which has been output from the feature collating section 55, and, using this information, accesses the accompanying information which is accumulated in the information accumulation section 51, acquires the corresponding information unit, and outputs it to the information presentation section 57.

Next, the information presentation section 57 reads in the information unit which has been output from the search information selection section 56 and, after performing any adjustments necessary for making this information easier for the user 2 to comprehend, according to requirements, transmits it to the user terminal 12 so as to present it to the user 2 via a display device or the like which is provided to the user terminal 12. Here, various methods might be conceived of for presenting information to the user 2. If the user 2 is utilizing a computer as the user terminal 12, for example, apart from the method of informing him by electronic mail, a method may be considered of displaying the search results upon a web page or the like, if as described above a web page is being used as the input-output interface for searching. Further, if for example the user 2 is using a mobile telephone as the user terminal 12, a method may be considered of informing him via voice, or of informing him via an Internet connection service aimed at mobile telephones (the so-called "I-mode" (registered trademark) service or the like), etc. It should be noted that, if information selection is performed by the accompanying information selection section shown in FIG. 3 when inputting the search key, then the information presentation section 57 changes the order of presentation of the accompanying information to agree with the conditions of information selection.

FIG. 6 shows an example of display in web page format upon the user terminal 12 of search results transmitted from the information search apparatus 5. In this example of display, there are shown search results which have been obtained when a television commercial has been captured using the user terminal 12, and feature time-series data to be searched for have been clipped from the video image signal which has been obtained and have been transmitted to the information search server 15. In this figure, along with the number of cases of similar accompanying information which have been found, related URLs and input fields for goods purchase information (the telephone number of the user 2 and date for the commencement of service) required for purchasing the goods in question are displayed, as accompanying information related to the search details which were selected by the search range selection section and the accompanying information selection section shown in FIG. 3.

Finally, results of experiments which have been performed in order to demonstrate the possibility of implementation and the characteristics in practice of the information search server 15 of this embodiment will be described. In these experiments, the information search server 15 shown in FIG. 1 was implemented upon a workstation, sound features corresponding to 3000 tunes were accumulated, and then searching was performed using 100 snatches of tunes each 10 seconds long which had been selected at random as search keys. The results were that the average time period required for searching was 2 seconds, and search results were obtained which were 100% accurate. Here by 100% search accuracy is meant that there were no cases in which incorrect information units were output as search results, and no cases in which information units which should have been output were not in fact so output.

Variant Example 1

In the previous description it has been supposed that the sound or video image time-series data itself has been inputted to the information search server 15, but it is also possible for the time-series signal feature data to be inputted to the information search server 15. With the construction as described above in which the time-series data itself is inputted to the information search server 15, it becomes impossible to ignore the time period which is required for transferring the time-series data from the user terminal 12 to the information search server 15, since the quantity of data in the time-series data is quite large. Furthermore the load upon the information search server 15 becomes great, since it is necessary for the information search server 15 to calculate the feature data for time-series data which are transmitted from a large number of user terminals individually. Due to these facts, if the structure is arranged so that the time-series signal feature data are calculated on the side of the user terminal 12 before being transmitted to the information search server 15, it is possible to anticipate reduction of the load upon the information search server 15 by thus reducing the amount of data which is transmitted and distributing the processing.

Figure 7:
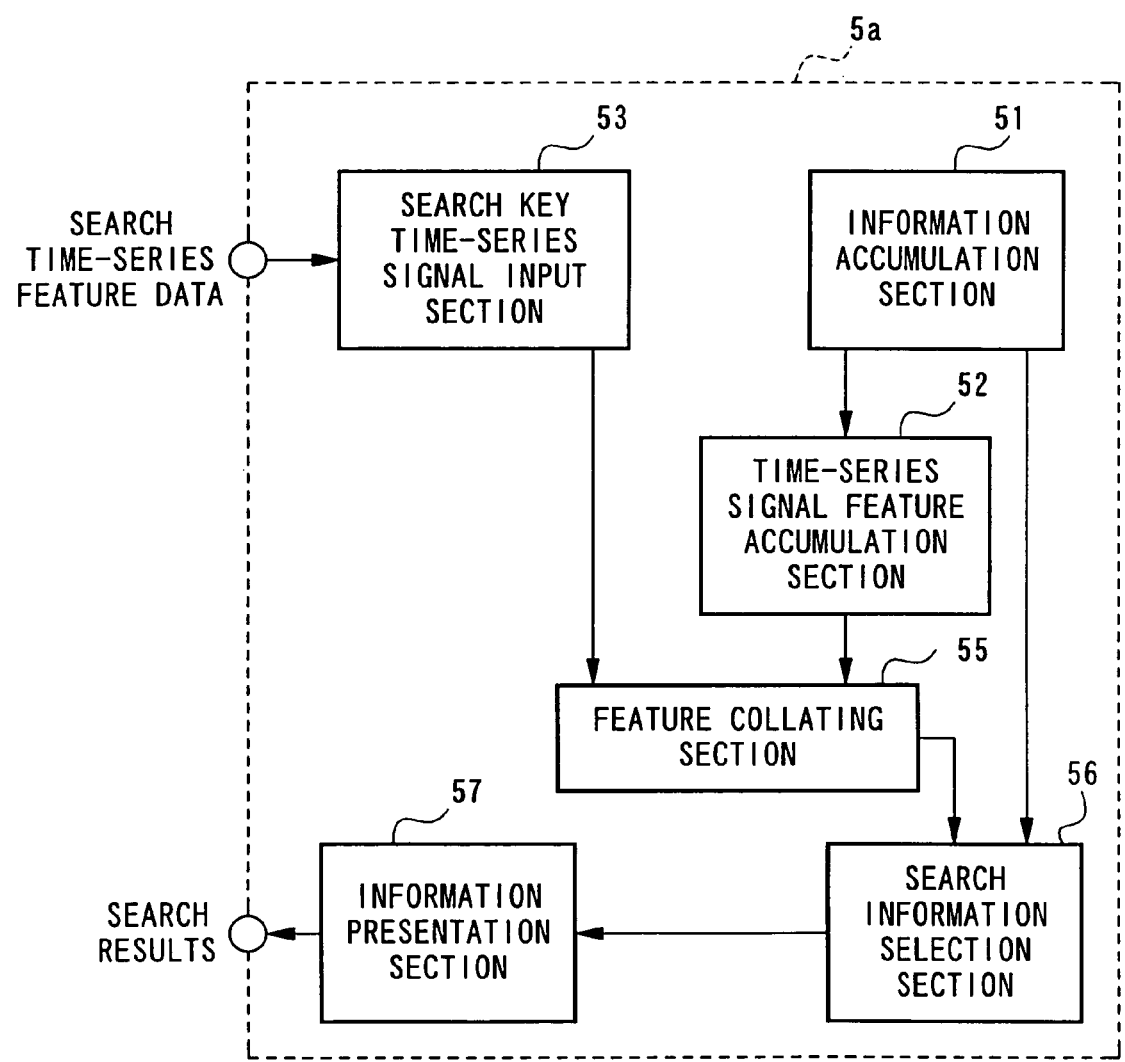
FIG. 7 is a block diagram showing the structure of an information search apparatus according to a first variant example of the first preferred embodiment of the present invention.

FIG. 7 is a block diagram showing the structure of an information search apparatus 5a according to this first variant example of the first preferred embodiment of the present invention. In this figure, to structural elements which are the same as ones shown in FIG. 2, the same reference symbols are affixed. It should be understood that, apart from the information search apparatus 5a, the rest of the structure is the same as in the above described first preferred embodiment. In this information search apparatus 5a, instead of the time-series data, it is the search time-series feature data which is transferred to the search key time-series signal input section 53. Further, the feature calculation section 54 which was provided to the information search apparatus 5 of FIG. 2 is not provided in this first variant embodiment, and instead the search time-series feature data which have been received by the search key time-series signal input section 53 are directly inputted to the feature collation section 55.

Figure 8:
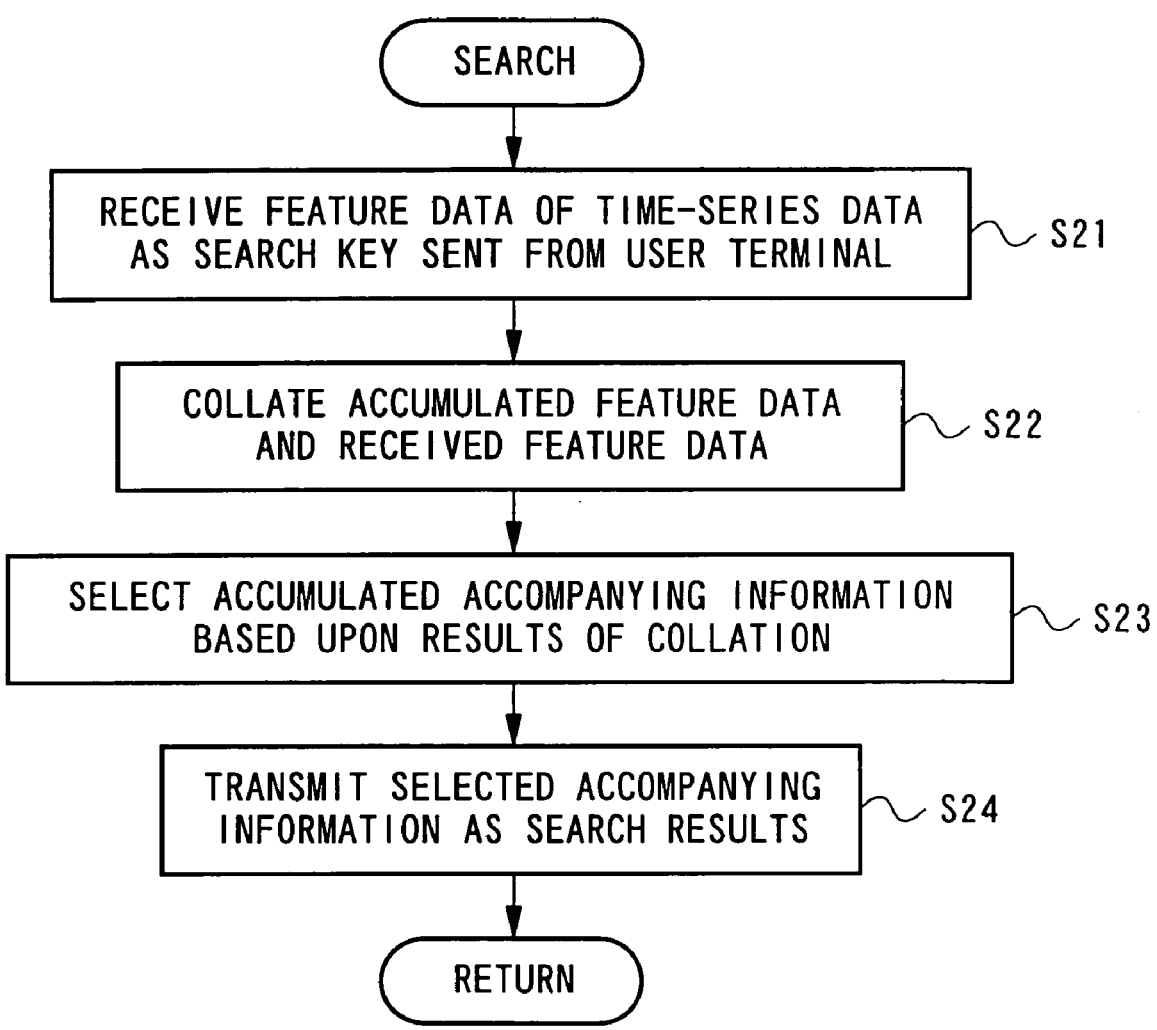
FIG. 8 is a flow chart showing the operation of an information search procedure according to this first variant example.

FIG. 8 is a flow chart showing the operation of an information search procedure performed by the information search apparatus 5a. The processing performed in the steps S21 through S24 of this flow chart corresponds to the processing performed in the steps S11 and S13 through S15 of the FIG. 5 flow chart. Moreover, the overall search service processing shown in FIG. 4 is the same. The points in which the operation of this information search apparatus 5a differs from the operation of the previous information search apparatus 5 are that in the step S21 the search time-series feature data is received from the user terminal 12, and that in the step S22 the received search time-series feature data are used for the collation process just as they are.

According to this variant example, it becomes unnecessary to transfer the large amount of time-series data between the user terminal 12 and the information search server 15. Furthermore it becomes possible to simplify the structure of the information search apparatus, since it is possible to manage without the provision of the feature calculation section 54 within the information search apparatus, and it also becomes possible to lighten the processing burden upon the information search apparatus to the extent that the calculation of the feature data is not performed thereby but is omitted.

Variant Example 2

Figure 9:
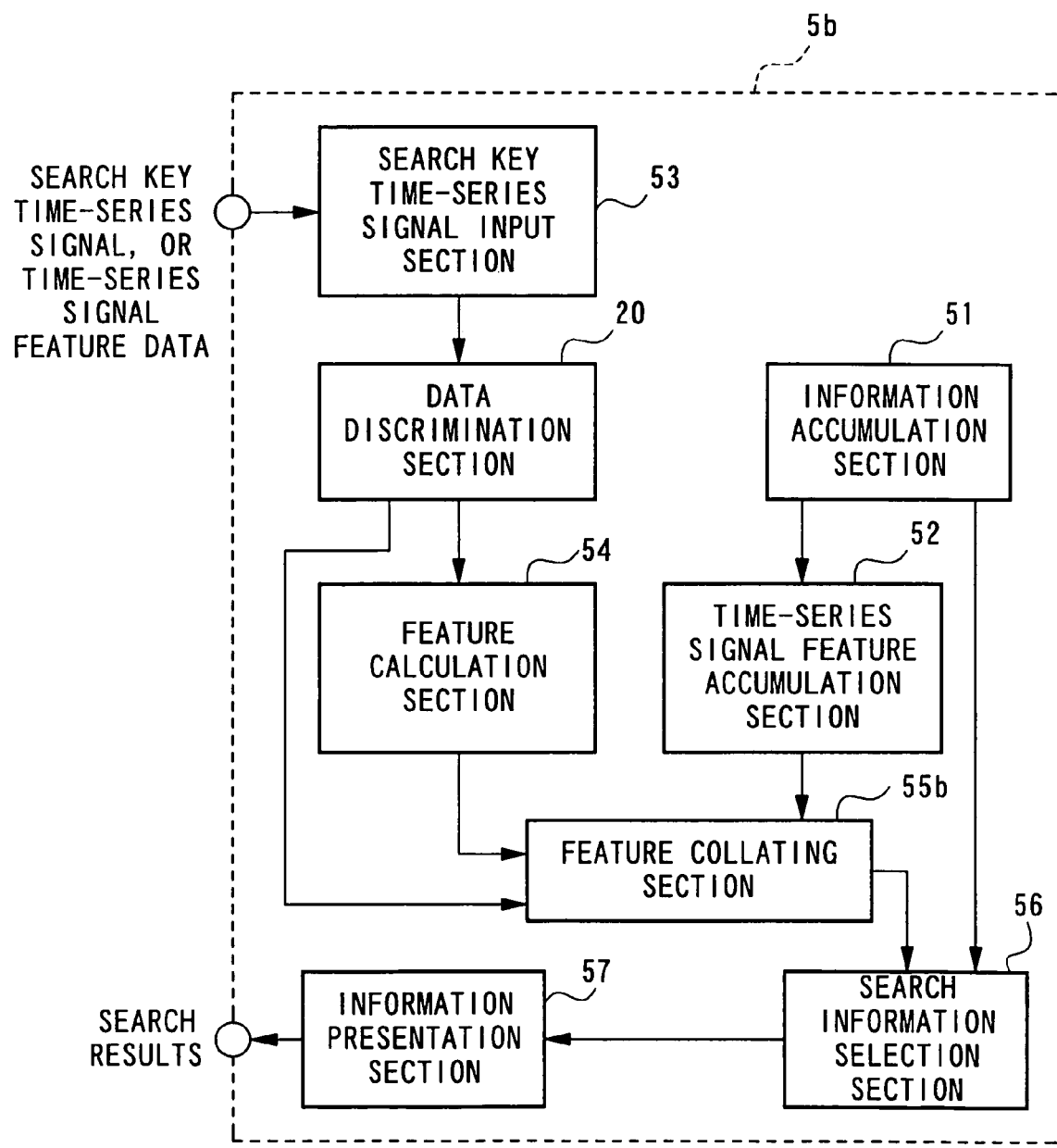
FIG. 9 is a block diagram showing the structure of an information search apparatus according to a second variant example of the first preferred embodiment of the present invention.

This variant example is one which is capable of inputting both the time-series data and the time-series signal feature data to the information search server 15 as search keys. FIG. 9 is a block diagram showing the structure of an information search apparatus 5b according to this second variant example of the first preferred embodiment of the present invention. In this figure, to structural elements which are the same as ones shown in FIG. 2, the same reference symbols are affixed. It should be understood that, apart from the information search apparatus 5b, the rest of the structure is the same as in the above described first preferred embodiment. In this information search apparatus 5b, either one of the time-series data and the search time-series feature data is transferred to the search key time-series signal input section 53 as a search key. Further, in this information search apparatus 5b, a data discrimination section 20 is additionally provided to the information search apparatus 5. This data discrimination section 20 discriminates whether the data which is received by the search key time-series signal input section 53 is time-series data or time-series signal feature data, and, if it is time-series data which is input, then this time-series data is output to the feature calculation section 54, while if it is time-series signal feature data which is input, then this is output to the feature collation section 55 b, bypassing the feature calculation section 54. The feature collation section 55b of this second variant embodiment differs from the feature collation section 55 of the first preferred embodiment shown in FIG. 2, in that it receives the time-series signal feature data which is output either from the feature calculation section 54 or from the data discrimination section 20, but its other functions are the same as those of that feature collation section 55.

Figure 10:
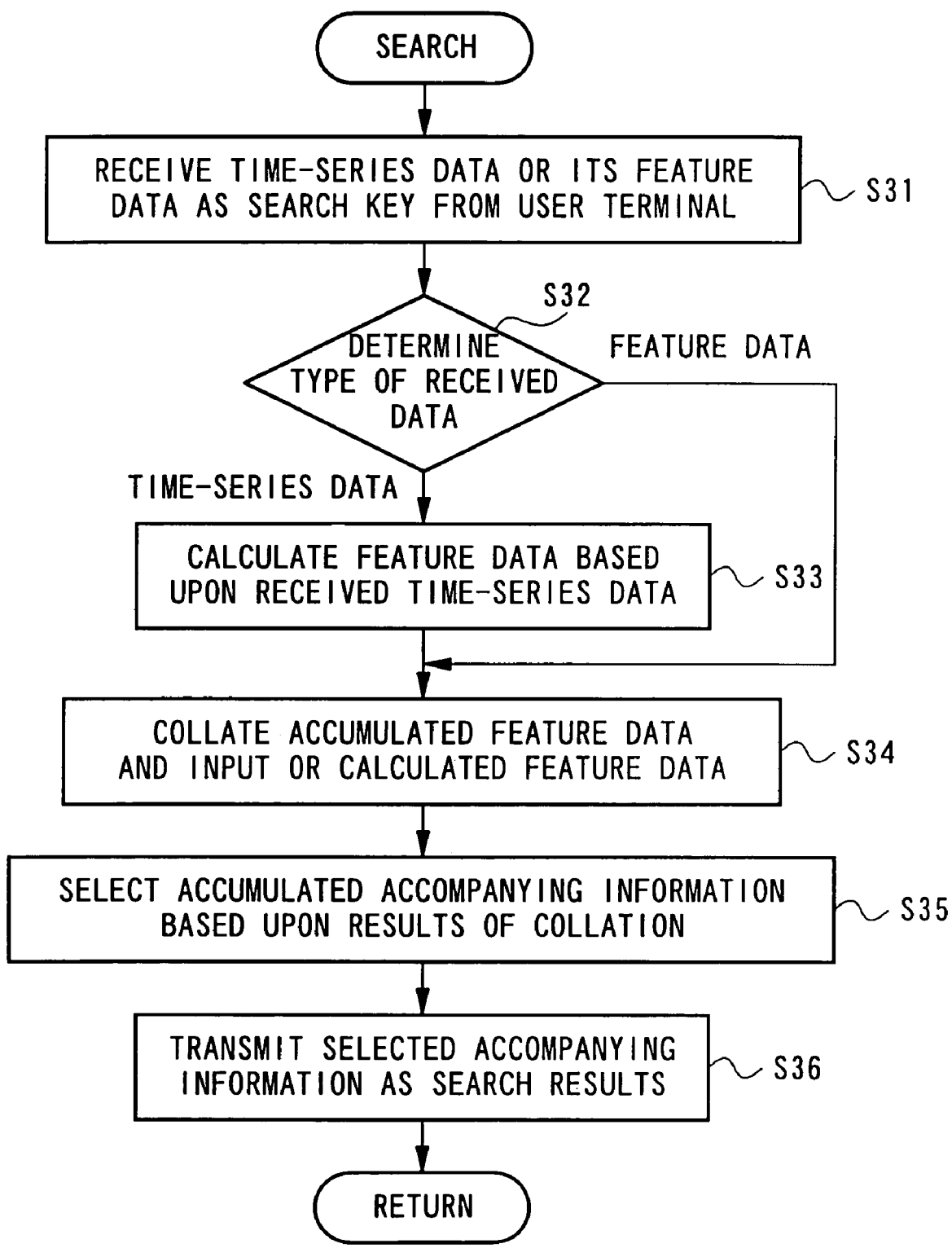
FIG. 10 is a flow chart showing the operation of an information search procedure according to this second variant example.

FIG. 10 is a flow chart showing the operation of an information search procedure performed by the information search apparatus 5b. The processing performed in the steps S31 and S33 through S36 of this flow chart corresponds to the processing performed in the steps S11 through S15 of the FIG. 5 flow chart. Moreover, the overall search service processing shown in FIG. 4 is the same. The points in which the operation of this information search apparatus 5b differs from the operation of the previous information search apparatus 5 are that (in a step S31) either time-series data or time-series feature data is received from the user terminal 12, when data has been received from the user terminal 12, the type of that received data is discriminated in a step S32, and if it is time-series data then (in a step S33) calculation of its feature data is performed using the feature calculation section 54, while if it is time-series signal feature data then this calculation procedure for feature data is skipped and the flow of control proceeds to the process of collation of the feature data (in a step S34).

Since according to this second variant example it is possible for the information search server 15 to receive either one of time-series data and time-series signal feature data, therefore it is possible to implement a system in which some user terminals transmit time-series data just as it is to the information search server 15, while other user terminals transmit time-series signal feature data to the information search server 15. Thus it is possible to implement a system in which, for example, user terminals whose processing power is low transmit the time-series data just as it is to the information search server 15 without modification, while, on user terminals which have no margin for storing the time-series data just as it is because their storage capacity is low, only the feature data is stored and transmitted to the information search server 15, since its data volume is low.

Embodiment 2

With this second preferred embodiment, it is arranged to be possible for the information provider 1 to register (add) new information upon the information search server, or to delete information therefrom. In concrete terms, it is arranged to be possible to renew the accompanying information which is accumulated in the information accumulation section 51 (refer to FIG. 2) and the time-series signal feature data which is accumulated in the time-series signal feature accumulation section 52 from the information provider terminal 11 whenever required.

Figure 11:
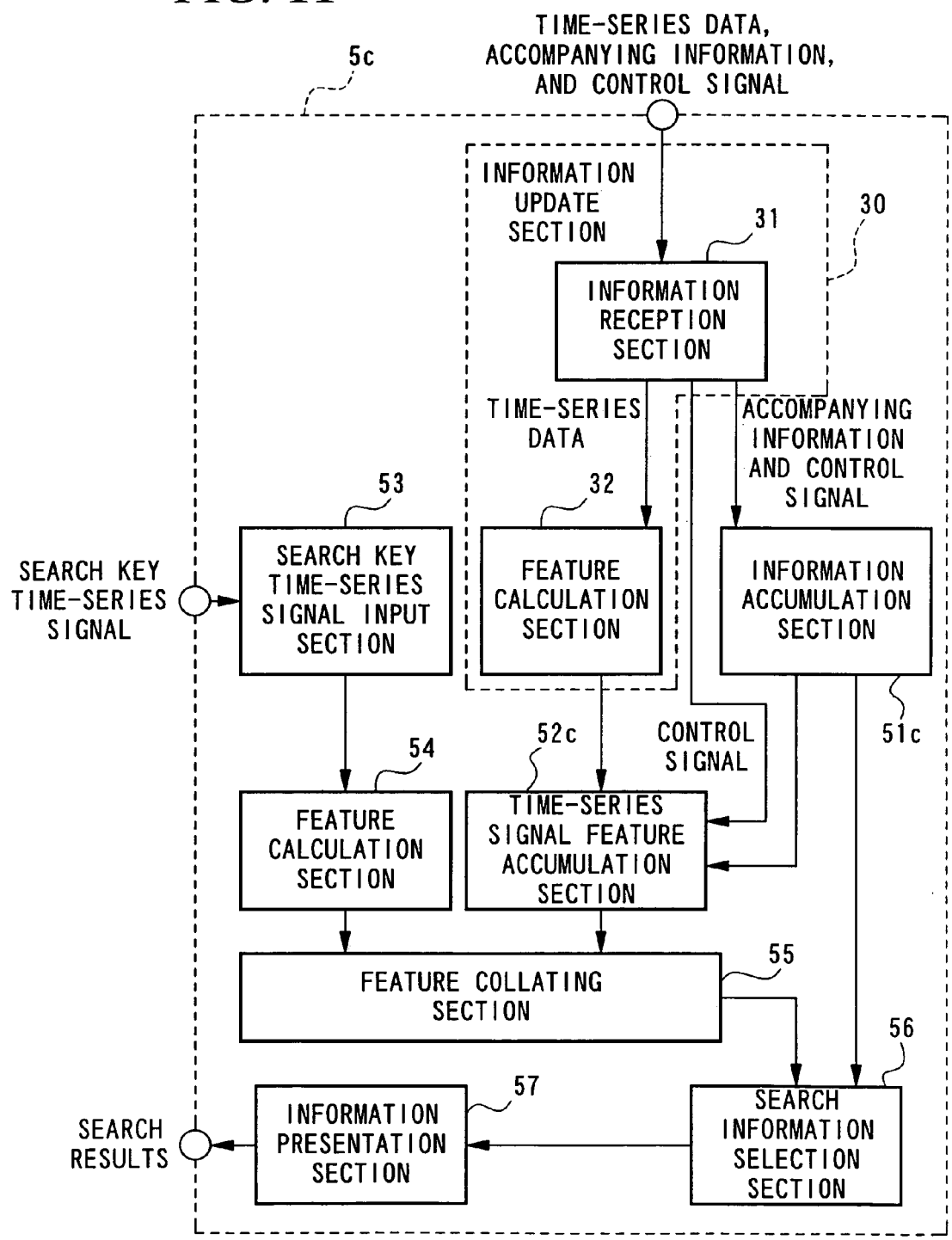
FIG. 11 is a block diagram showing the structure of an information search apparatus according to a second preferred embodiment of the present invention.

FIG. 11 is a block diagram showing the structure of an information search apparatus 5c according to this second preferred embodiment of the present invention. In this figure, to structural elements which are the same as ones shown in FIG. 2, the same reference symbols are affixed. It should be understood that, apart from the information search apparatus 5c, the rest of the structure is the same as in the above described first preferred embodiment. With this information search apparatus 5c, an information update section 30 is additionally provided to the information search apparatus 5. Further, in this second preferred embodiment, apart from inputting time-series data which is presented from the information provider terminal 11 and accompanying information related to it to the information update section 30 as update information, a control signal for issuing commands related to updating is also input to the information update section 30. Along with an information reception section 31 outputting the received time-series data to a feature calculation section 32, it also outputs the accompanying information which is received to an information accumulation section 51c. The feature calculation section 32 is of the same structure as the feature calculation section 54, and it calculates time-series signal feature data from the time-series data which is received and outputs the result to the time-series signal feature accumulation section 52c. Although the information accumulation section 51c and the time-series signal feature accumulation section 52c are respectively of the same structure as the information accumulation section 51 and the time-series signal feature accumulation section 52 shown in FIG. 2, they differ in that they are made so as to be able to delete information which is accumulated within them according to a control signal which is inputted via the information reception section 31. Moreover, in this control signal, as well as a delete signal which commands the deletion of information, there is also included data which specifies the information which is to be deleted.

Next, the information updating procedure which is performed by this information search apparatus 5c of this second preferred embodiment of the present invention will be described in detail with reference to the flow chart shown in FIG. 12.

First, the case of adding information will be explained. The information provider 1 operates his information provider terminal 11, and transmits the time-series data and accompanying information which are to be added to the information search server 15, along with an order the purport of which is to command the addition of this information. In the information search server 15, the information reception section 31 detects (in a step S41) that the signal has been transmitted from the information provider terminal 11, and it checks (in a step S42) whether or not time-series data and accompanying information have been received. If these are received (the YES branch from this step S42) then, since this is the addition of information, the information reception section 31 transmits the time-series data and the accompanying information which have been received to the feature calculation section 32 and to the information accumulation section 51c respectively. The feature calculation section 32 calculates time-series signal feature data based upon the time-series data which have been transmitted and transmits it to the time-series signal feature accumulation section 52c, and (in a step S43) this time-series signal feature data is accumulated in the time-series signal feature accumulation section 52c. Further, the information accumulation section 51c receives the transmitted accompanying information, and (in the step S44) establishes a relationship between it and the time-series signal feature data which has been added into the time-series signal feature accumulation section 52c and accumulates it. It should be understood that the order of processing of the steps S43 and S44 is not to be considered as being limited to the case shown in the figures.

Next, the case of deleting some of the information which has been accumulated will be explained. First, based upon the signal which has been received (in a step S41) from the information provider terminal 11, it is checked (in a step S42), in the same way as described above, whether or not time-series data and accompanying information have been transmitted, and if it is detected that these have not been transmitted (the NO branch from this step S42) then the information reception section 31 checks (in a step S45) whether or not a deletion signal is included in the control signal which is transmitted from the information provider terminal 11. And if it is detected that a deletion signal is included (the YES branch from this step S45) then the information reception section 31 transmits the control signal which has been received from the information provider terminal 11 to the information accumulation section 51c and to the time-series signal feature accumulation section 52c. According to this, the time-series signal feature accumulation section 52c deletes (in a step S46) the time-series signal feature data specified by the control signal which is transmitted. And the information accumulation section 51c deletes (in a step S47) the accompanying information specified by the control signal which is transmitted. It should be understood that the order of processing of the steps S46 and S47 is not to be considered as being limited to the case shown in the figures.

According to this second preferred embodiment of the present invention, it becomes possible to renew the information which is registered in the information search server 15 appropriately, according to requirements, without the information provider 1 being included within the search provider 4.

Variant Example 1

Figure 13:
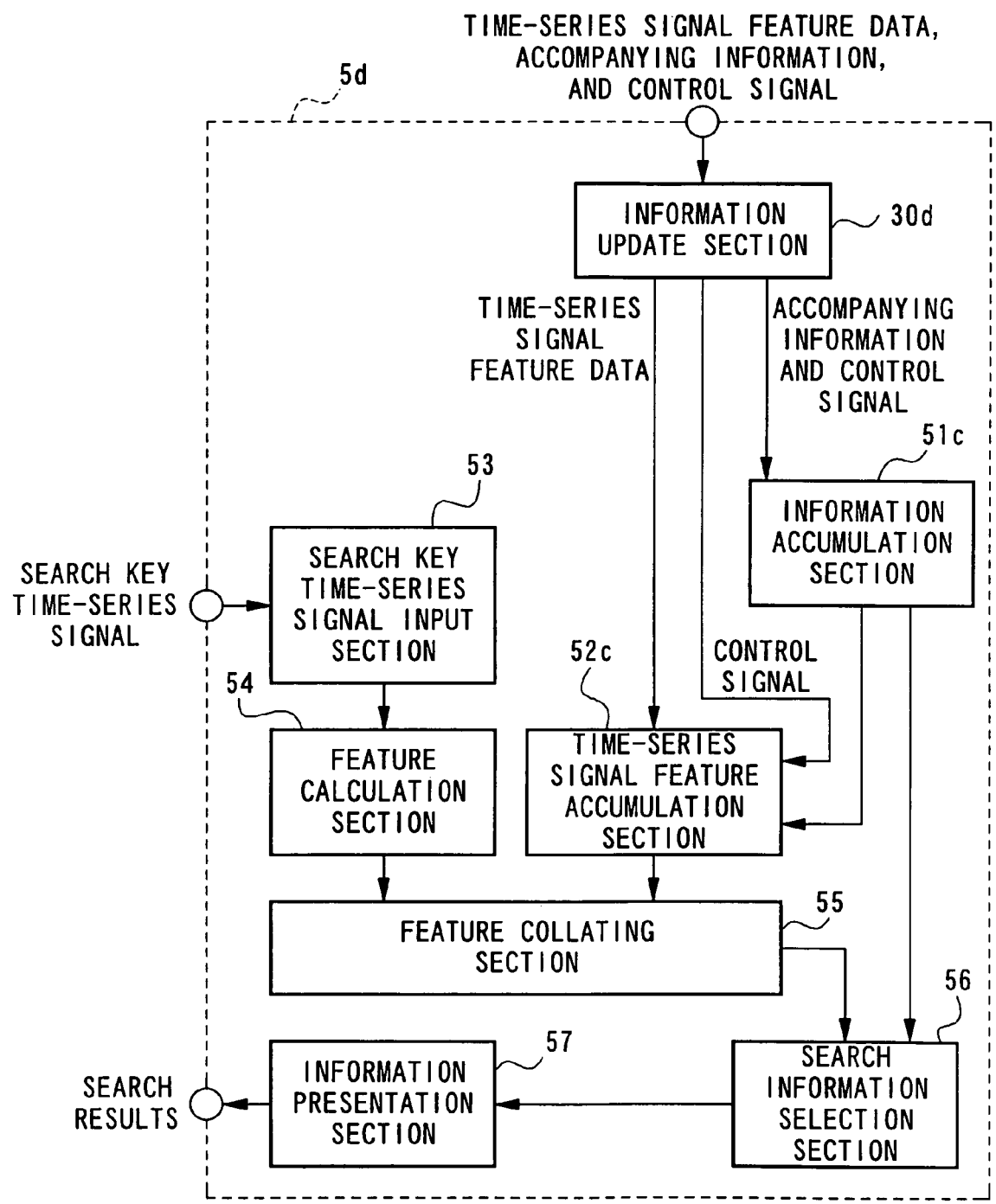
FIG. 13 is a block diagram showing the structure of an information search apparatus according to a first variant example of the second preferred embodiment of the present invention.

This first variant example of the second preferred embodiment will be explained by establishing correspondence with the first variant example of the first preferred embodiment, described above and shown in FIG. 7. Thus, in this variant example, the information provider 1 does not provide the time-series data as update information just as it is, but instead provides time-series signal feature data. FIG. 13 is a block diagram showing the structure of an information search apparatus 5d according to this first variant example of the second preferred embodiment of the present invention. In this figure, to structural elements which are the same as ones shown in FIG. 11, the same reference symbols are affixed. The points in which the information search apparatus 5d of this variant differs from the one shown in FIG. 11 are that what is inputted to the information update section 30d is not time-series data but is time-series feature data, and that the information update section 30d is made to be of the same structure as the information reception section 31 of FIG. 11, and is not provided with any structure which corresponds to the feature calculation section 32 of FIG. 11. Due to this, the time-series signal feature data which the information update section 30d has received from the information provider terminal 11 is directly inputted to the time-series signal feature accumulation section 52c.

Figure 14:
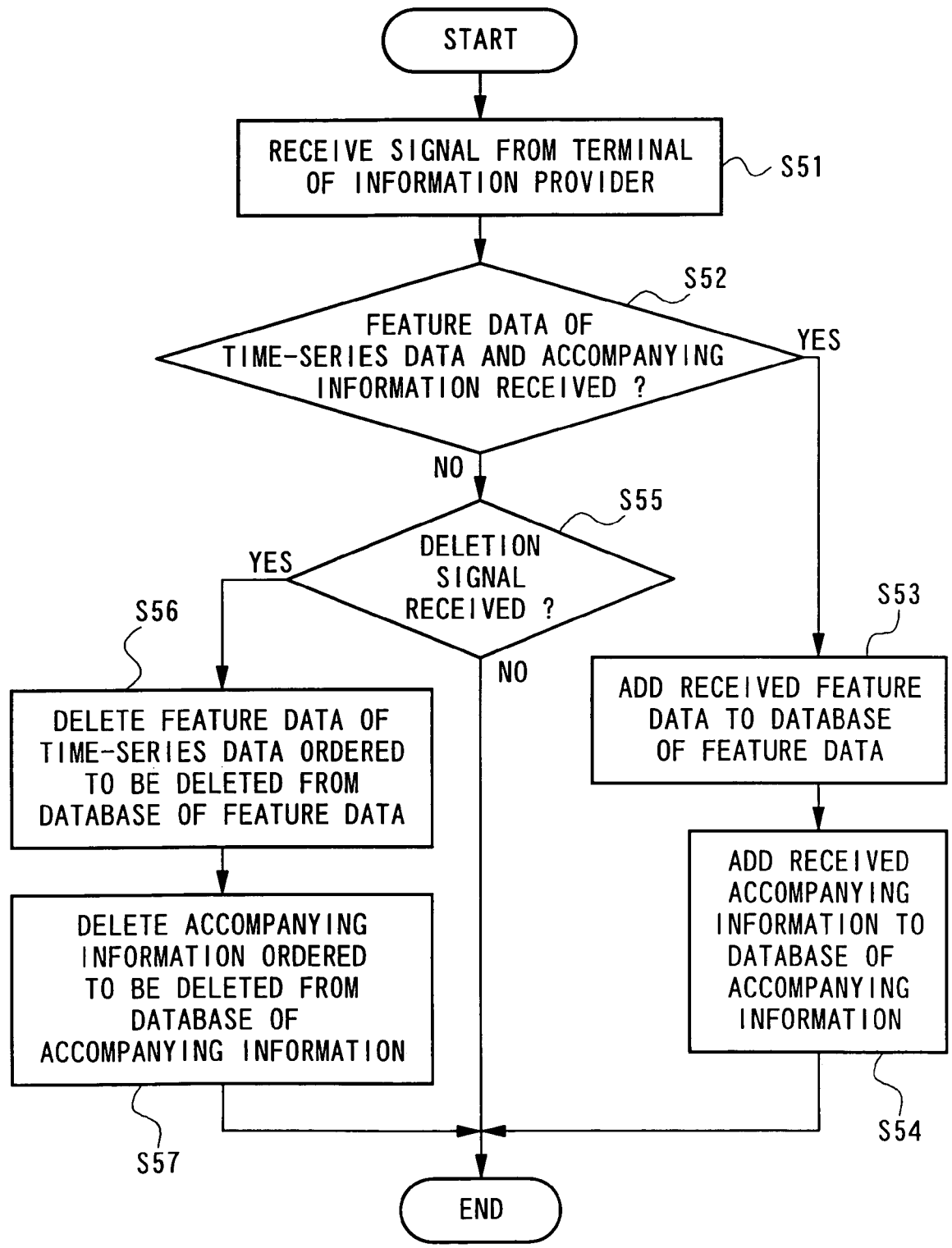
FIG. 14 is a flow chart showing the operation of an updating procedure according to this first variant example

FIG. 14 is a flow chart showing the operation of an information updating procedure performed by the information search apparatus 5d of this variant embodiment. The processing performed in the steps S51 through S57 of this flow chart corresponds to the processing performed in the steps S41 through S47 of the FIG. 12 flow chart. The points in which the information updating procedure shown in FIG. 14 differs from the one shown in FIG. 12 are as follows. First, on the side of the information provider 1, time-series signal feature data are calculated based upon the time-series data to be updated, and this together with the accompanying information and a control signal are together output to the information search server 15 and inputted to the information update section 30d. And, in the case that information is to be added to the information search server 15, the information update section 30d checks (in a step S52) whether or not the time-series signal feature data and the accompanying information have been received. Next, if the time-series signal feature data are to be added to the time-series signal feature accumulation section 52c, the information update section 30d transmits (in a step S53) the time-series signal feature data which has been received from the information provider terminal 11 just as it is to the time-series signal feature accumulation section 52c and accumulates it.

According to this variant example, it is possible for the updating of the information which is accumulated in the information search server 15 to be performed quickly, since it is not necessary to transmit a large amount of time-series data between the information provider terminal 11 and the information search server 15. Furthermore, it is possible to simplify the structure of the information search apparatus, since it is possible to manage without the provision of the feature calculation section 32 to the information update section 30d of the information search apparatus 5d.

Variant Example 2

This second variant example of the second preferred embodiment will be explained by establishing correspondence with the second variant example of the first preferred embodiment, described above and shown in FIG. 9. Thus, in this second variant example, the information provider 1 provides either of time-series data or time-series signal feature data as update information, and corresponding to this, it is arranged for it to be determined in the information search server 15 which of the types of data the update information is, and for the appropriate processing therefor to be performed.

Figure 15:
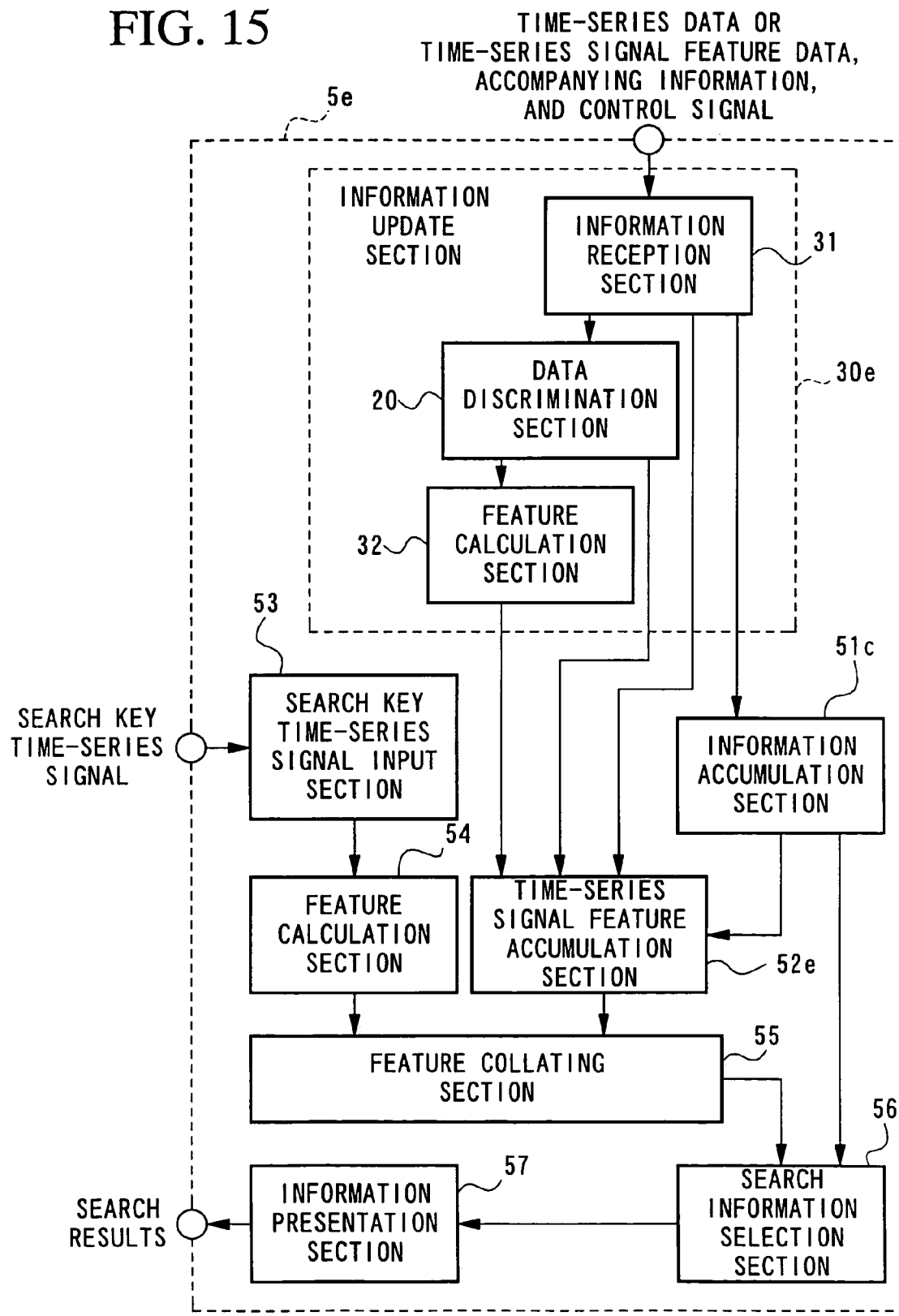
FIG. 15 is a block diagram showing the structure of an information search apparatus according to a second variant example of the second preferred embodiment of the present invention.

FIG. 15 is a block diagram showing the structure of an information search apparatus 5e according to this second variant example of the second preferred embodiment of the present invention. In this figure, to structural elements which are the same as ones shown in FIG. 11, the same reference symbols are affixed. The points in which the information search apparatus 5e of this second variant differs from the one shown in FIG. 11 are that, instead of time-series data, time-series signal feature data is inputted to the information update section 30e; that a data discrimination section 20 the same as the one shown in FIG. 9 is provided to the information update section 30e; and that the time-series signal feature accumulation section 52e is made so as to be able to receive time-series signal feature data which is output either from the feature calculation section 32 or from the data discrimination section 20.

Figure 16:
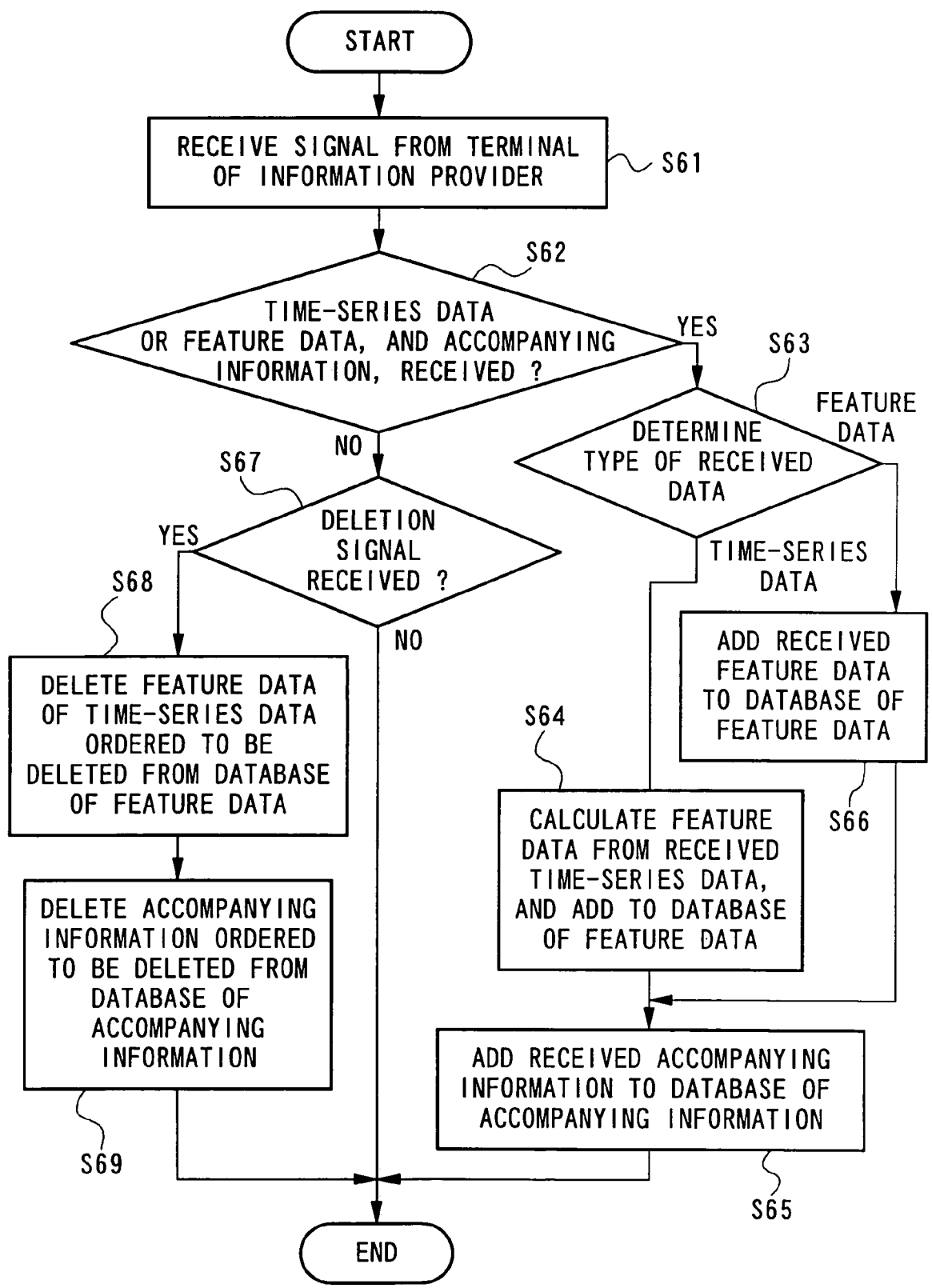
FIG. 16 is a flow chart showing the operation of an updating procedure according to this second variant example.

FIG. 16 is a flow chart showing the operation of an information updating procedure performed by the information search apparatus 5e of this second variant embodiment. The processing performed in the steps S61 through S69 of this flow chart, except for the steps S63 and S66, corresponds to the processing performed in the steps S41 through S47 of the FIG. 12 flow chart. The points in which the information updating procedure shown in FIG. 16 differs from the one shown in FIG. 12 are as follows. First, on the side of the information provider 1, either one of time-series data or time-series signal feature data is outputted together with accompanying information and a control signal to the information search server 15. Next, in the case that information is to be added to the information search server 15, the accompanying information is output to the information update section 30e, and it is checked (in a step S62) which of time-series data and time-series signal feature data has been received. The information reception section 31 transmits the time-series data or the time-series signal feature data which has been received just as it is to the data discrimination section 20, which discriminates (in a step S63) which type of data it is. If it is time-series data which has been received, then the data discrimination section 20 transfers this time-series data to the feature calculation section 32, which calculates the time-series signal feature data and accumulates it (in a step S64) in the time-series signal feature accumulation section 52e. By contrast, if it is time-series signal feature data which has been received, then the data discrimination section 20 transfers it just as it is to the time-series signal feature accumulation section 52c, where it is accumulated (in a step S66).

According to this second variant example, it is possible to select whether the update information furnished by the information provider terminal 11 should be time-series data or time-series signal feature data, as appropriate.

Variant Example 3

In FIG. 11, for the convenience of explanation, the feature calculation section 32 within the information update section 30 was provided separately from the feature calculation section 54. However, since the structures of these two feature calculation sections are mutually identical, it is desirable to simplify the construction by providing only one feature calculation section, which serves the functions of both of these feature calculation sections in the search key time-series signal input section 53 and in the information update section 30.

Figure 17:
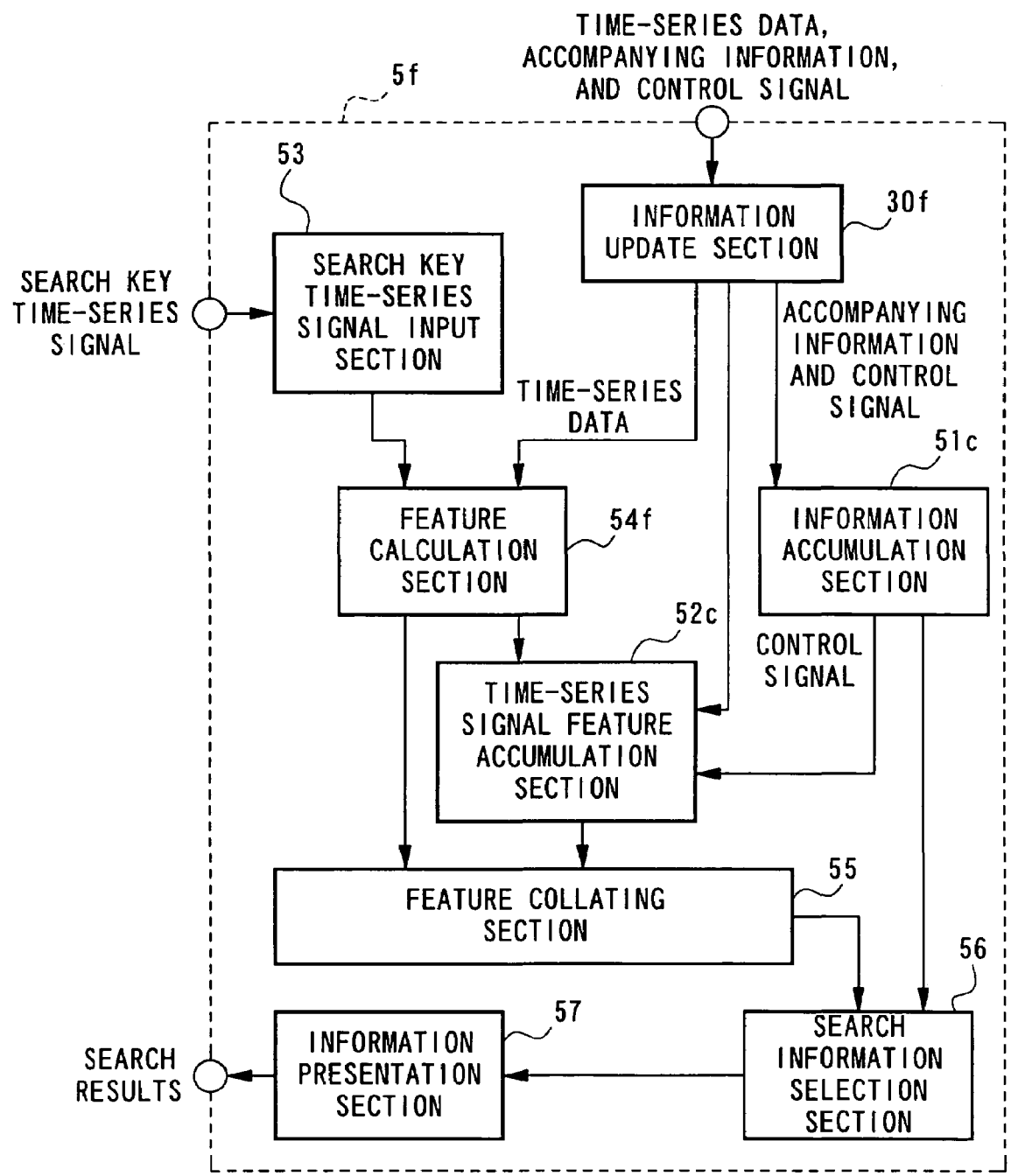
FIG. 17 is a block diagram showing the structure of an information search apparatus according to a third variant example of the second preferred embodiment of the present invention.

FIG. 17 is a block diagram showing the structure of an information search apparatus 5f according to this third variant example of the second preferred embodiment of the present invention. In this figure, to structural elements which are the same as ones shown in FIG. 11, the same reference symbols are affixed. The points in which the information search apparatus 5f of this third variant differs from the one shown in FIG. 11 are that the information update section 30f has the same structure as the information reception section 31 of FIG. 11 but is not provided with the feature calculation section 32 of FIG. 11, and that instead of the feature calculation section 54a feature calculation section 54f is provided. This feature calculation section 54f, if search key time-series signal has been supplied from the search key time-series signal input section 53, transmits corresponding time-series signal feature data to the feature collation section 55, while if time-series data has been supplied from the information update section 30f, it transmits corresponding time-series signal feature data to the time-series signal feature accumulation section 52c.

Figure 12:
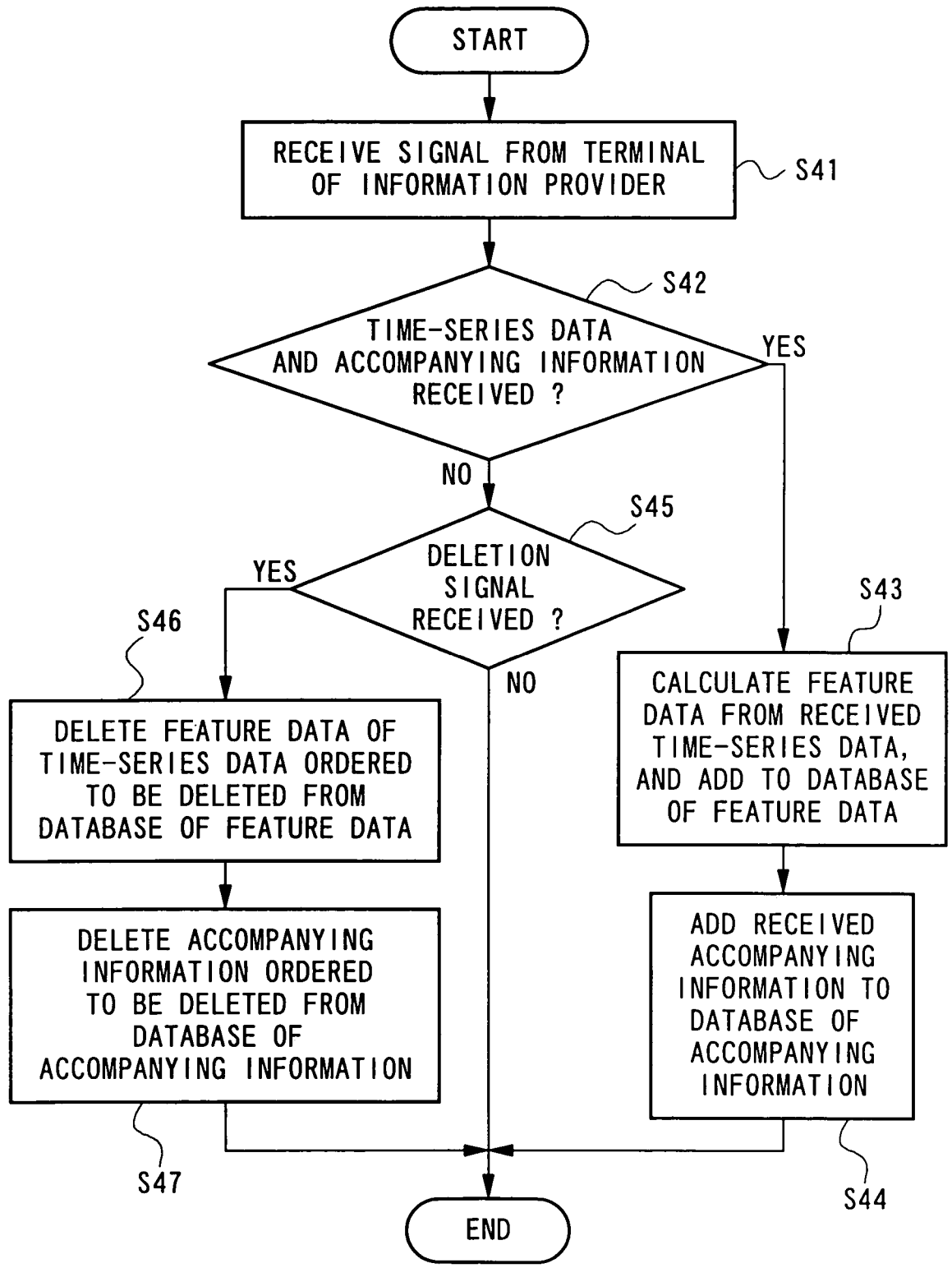
FIG. 12 is a flow chart showing the operation of an updating procedure for information accumulated in the information search apparatus according to this second preferred embodiment.

The operation of this third variant example is identical to that when the information search apparatus 5c shown in FIG. 11 is used (see the FIG. 12 flow chart).

It should be noted that the concept of the second variant example (see FIG. 15) can also be applied to this third variant example.

Embodiment 3

For this third preferred embodiment, the explanation will be made of an information search server for which the accompanying information includes goods information, and with which the user is able to purchase goods based upon goods information which is included in the search results. This third preferred embodiment is made so that, for example, the user is able to perform searching based upon a portion of a tune which he has heard during a commercial message, and, without going to a shop, can obtain information relating to a CD upon which this tune is recorded, and can order this CD.

Figure 18:
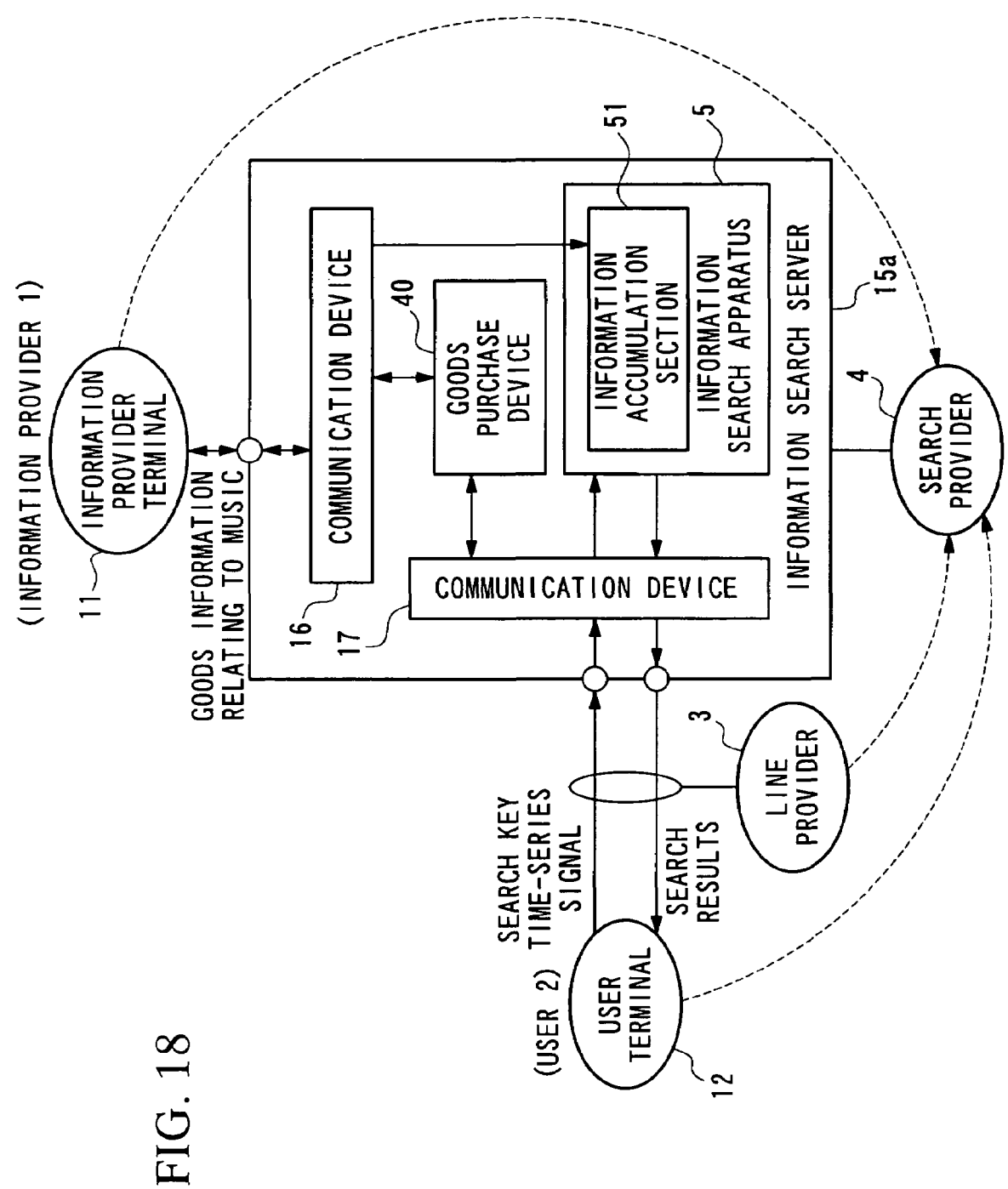
FIG. 18 is a block diagram showing the structure of an information search system according to a third preferred embodiment of the present invention.

FIG. 18 is a block diagram showing the structure of an information search system according to this third preferred embodiment of the present invention. In this figure, to structural elements which are the same as ones shown in FIG. 1, the same reference symbols are affixed. As compared with the information search server 15 of FIG. 1, the information search server 15a of this third preferred embodiment is additionally provided with a goods purchase device 40 which transmits and receives information via the communication devices 16 and 17.

Figure 19:
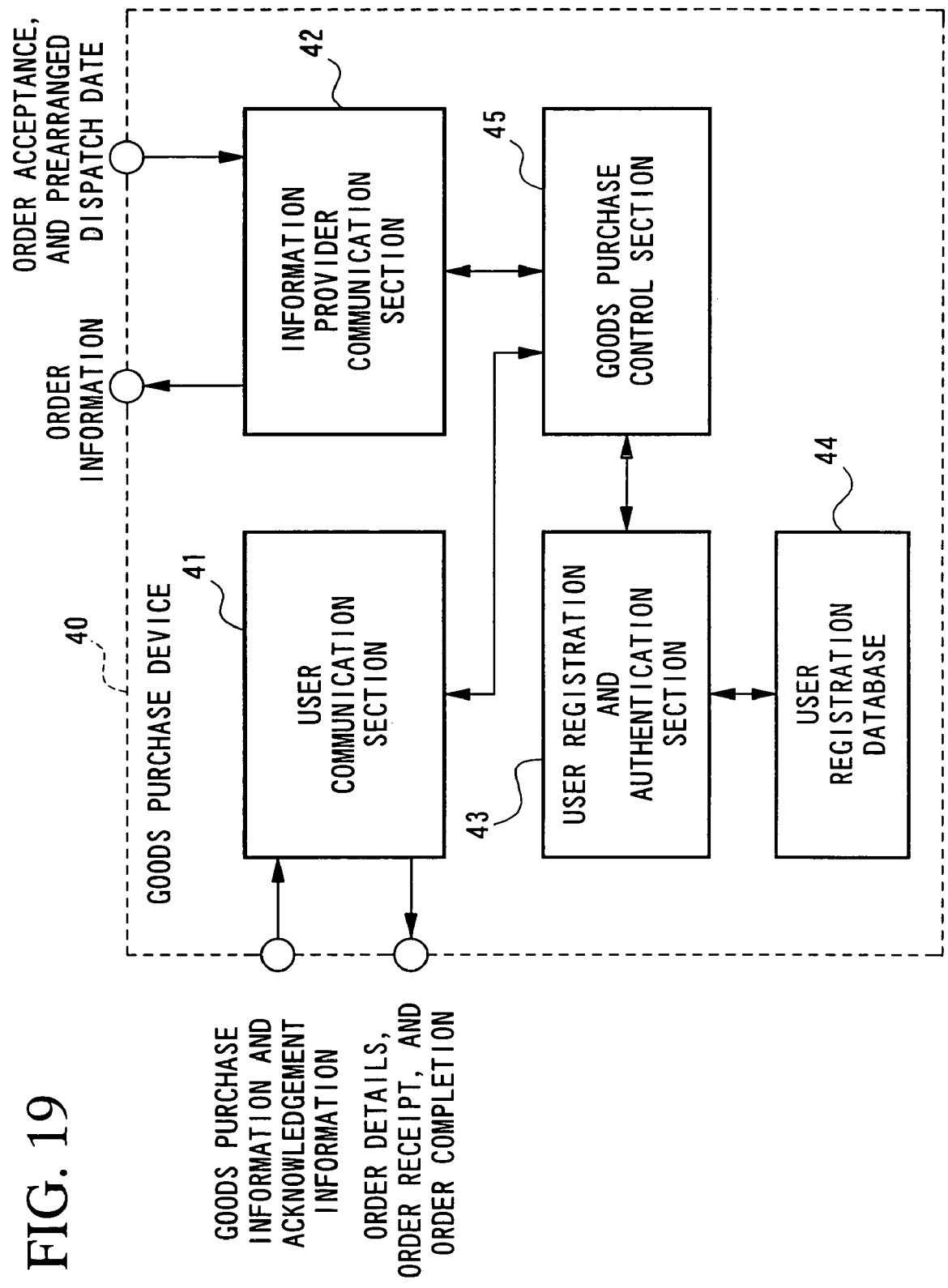
FIG. 19 is a block diagram showing the details of a goods purchase device according to this third preferred embodiment.

FIG. 19 is a block diagram showing the detailed structure of this goods purchase device 40 of the third preferred embodiment. Referring to this figure, a user communication section 41 transmits and receives information to and from the user terminal 12 via the communication device 17 shown in FIG. 18. In the same manner, an information provider communication section 42 transmits and receives information to and from the information provider terminal 11 via the communication device 16. A user registration and authentication section 43 refers to a user registration database 44 in which information related to each user is registered in order to offer goods purchase services to specified users only, and performs user registration and authentication. A goods purchase control section 45 controls the various sections of the goods purchase device 40, and sends and receives information to and from the user terminal 12 and the information provider terminal 11 via the user communication section 41 and the information provider communication section 42. It should be noted that the details of the functioning of the user registration and authentication section 43 and of the goods purchase control section 45 will be explained hereinafter, and will become clear from the explanation of their operation.

Figure 20:
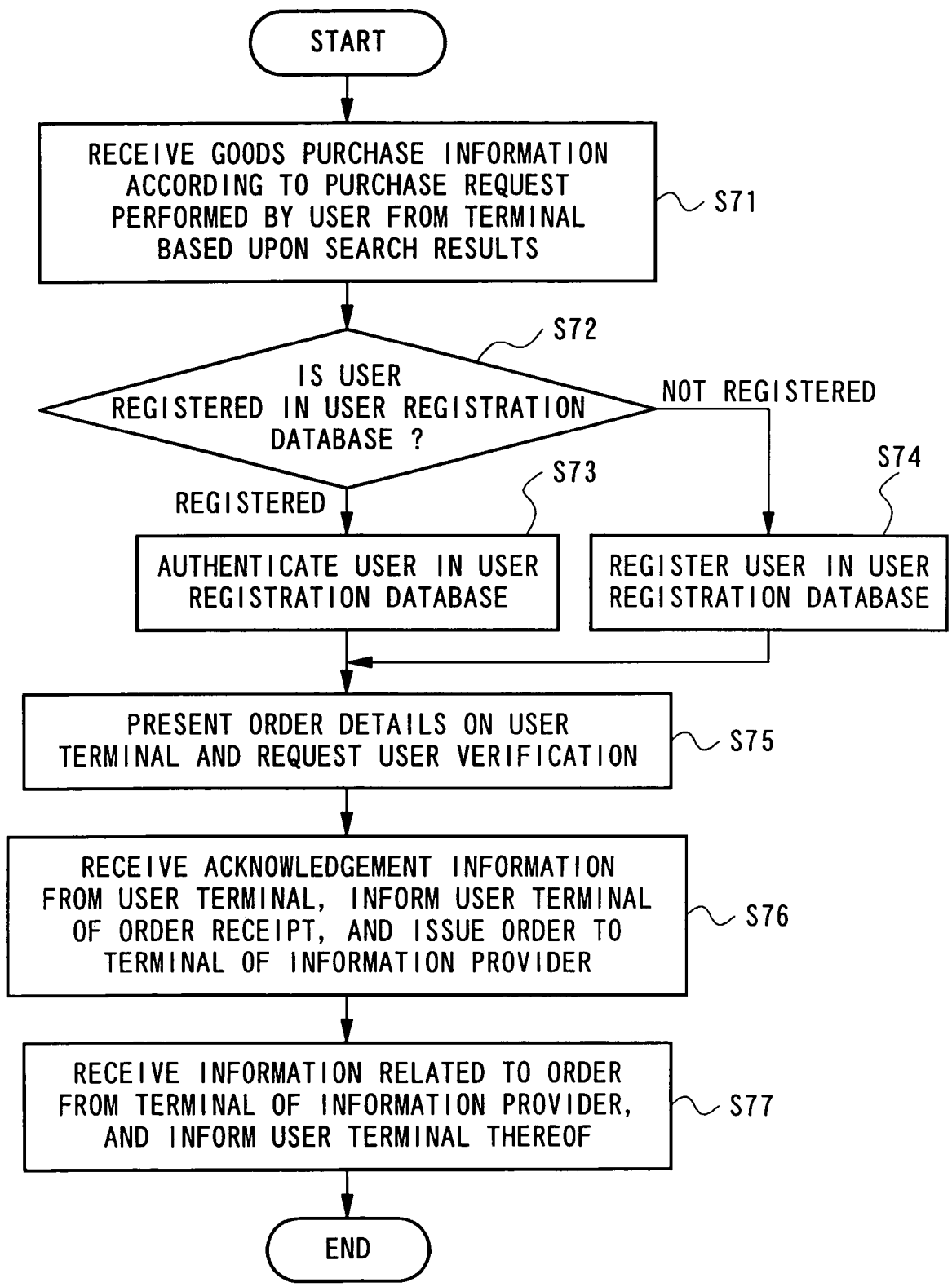
FIG. 20 is a flow chart showing a goods purchasing processing procedure performed by this goods purchase device.
Figure 21:
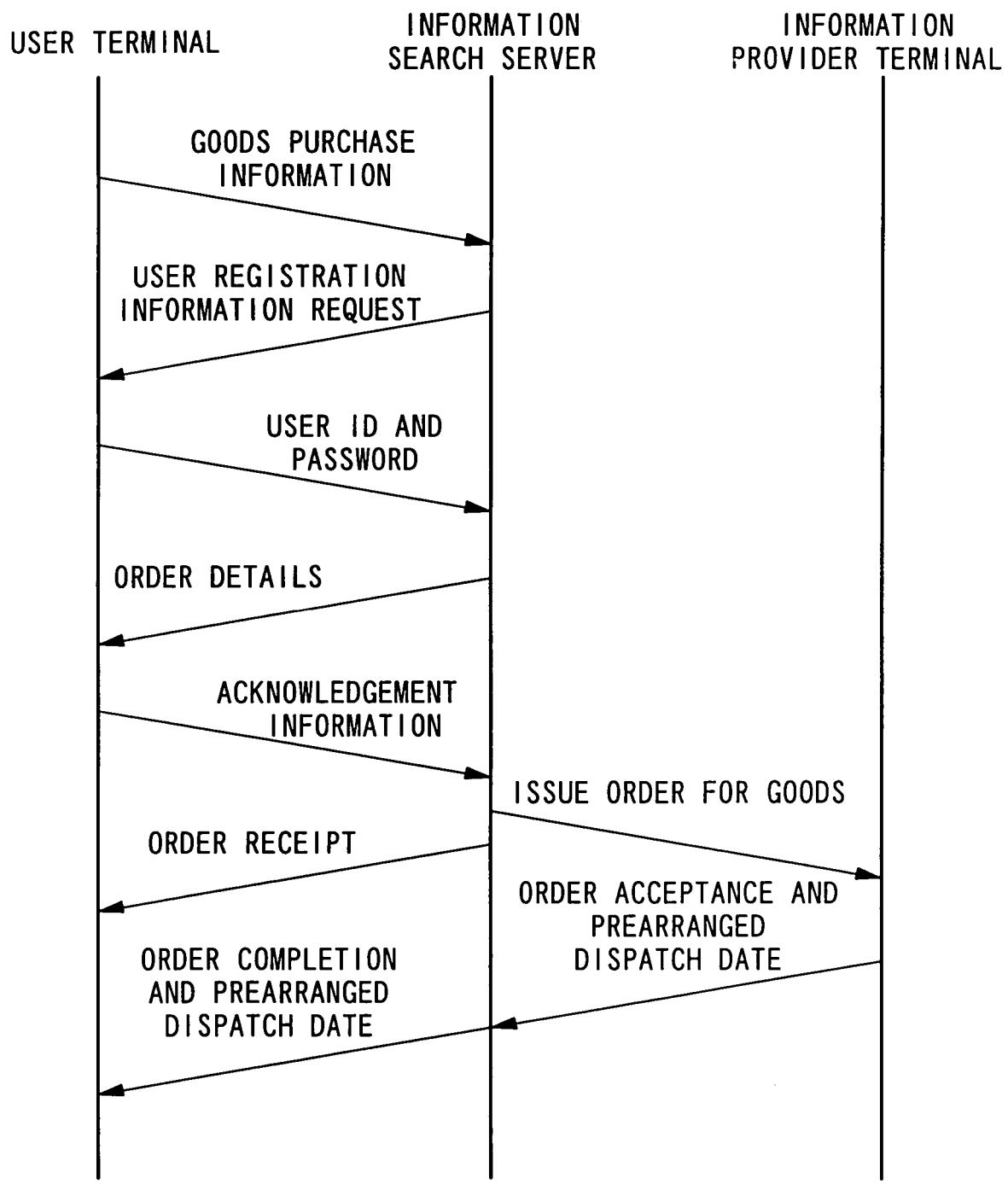
FIG. 21 is an explanatory figure showing the flow of data in this third preferred embodiment between a user terminal, an information search server, and an information provider terminal.

Next, the operation of the information search system structured as described above when a user 2 purchases goods will be explained. In this connection, FIG. 20 is a flow chart showing the processing procedure which is implemented by the goods purchase device 40. Furthermore, FIG. 21 is an explanatory figure, based upon the following explanation, showing the overall flow of data which is transmitted and received in this third preferred embodiment between the user terminal 12, the information search server 15a, and the information provider terminal 11. It should be noted that in FIG. 21 the case is shown when a legitimate user who is registered upon the information search system purchases goods, and the case in which the attempt to authenticate the user results in failure is not specifically shown.

In the following, the case in which the subject of search by the user is a tune which is recorded upon a CD will be explained by way of example. In order to do this, the information accumulation section 51 and the time-series signal feature accumulation section 52 in the information search apparatus 5 (refer to FIG. 2) respectively accumulate the accompanying information for each tune, and the time-series signal feature data for each tune. It should be understood that the title of a tune which is recorded upon a CD, the name of a performer, the title of another tune or tunes by the same performer, a goods number for related goods or an order method, or the like may be used as the goods information which accompanies the title of a CD.

First, the user 2 operates the user terminal 12 and transmits a snatch of sound (music) which he has encountered to the information search server 15a, for example as in the first preferred embodiment described above. The information search server 15a performs a search in, for example, the same manner as in the first preferred embodiment described above, and transmits to the user terminal 12 the search results which are related to the snatch of music which was transmitted by the user 2 (the accompanying information, such as the name of the tune and the title of the CD, or the like). It should be understood that the method of transmission of the search results to the user terminal 12 may be the same as the method utilized in the first preferred embodiment, as described above.

Next, the user 2 accesses the CD information which has been displayed in the search results and decides whether or not to purchase the CD. In other words, the user 2 operates the user terminal 12, and transmits goods purchase information for purchasing the CD to the information search server 15a, which inputs it (in a step S71) to the goods purchase device 40. Here, various different methods may be considered for the user to access the goods purchase device 40 using the user terminal 12. Although various examples are shown below, these are only to be considered as examples, and there will be no problem in the access to the goods purchase device 40 of this information search system being made by utilizing any of various possible methods.

First, if the user terminal 12 is a computer, the method may be contemplated of using email to transmit and to receive information, and moreover, if the computer is HTML (Hyper Text Markup Language) mail capable, it may be considered to embed URL information in the CD information, and to start the operation of a browser by the user selecting this URL information upon his user terminal 12, so that a home page for purchasing the CD may be displayed. On the other hand, if the computer is not HTML mail capable but is only capable of handling text-only email, the method may be contemplated of appending individual numbers to each of the separate items of CD information, and of instructing the user to transmit electronic mail in which the number of the title is included, etc. Alternatively, the same method as used in the case of HTML mail may be implemented by utilizing a web page.

Upon access from the user terminal 12, the goods purchase device 40 performs authentication of the user 2. In detail, in a step S72, the user registration and authentication section 43 shown in FIG. 19 checks whether or not this user who has accessed the system is registered in the user registration database 44, and it informs the goods purchase control section 45 of the result. Based upon this result, for a user who is registered as having purchased goods in the past by using this information search system, the goods purchase control section 45 requests input from the user terminal 12 of the user ID (the identification number) which has been allocated to this user, and performs authentication (in a step S73), based upon the user ID which has been transmitted from the user terminal 12, according to user data in the user registration database 44 related to the corresponding user ID (for example, according to a password which corresponds to this user ID).

On the other hand, for a user who is not registered and who is utilizing this information search system for the first time, the goods purchase control section 45 requests (in a step S74) this user who has accessed the system to execute user registration procedures. Various methods may be considered for performing this user registration. For example, if the user 2 is utilizing a mobile telephone as the user terminal 12, the system may request input of the number of the mobile telephone, the address and/or the name of the user, his credit card number, or the like. Further, if a computer is being used as the user terminal 12 and access is being performed via electronic mail, then it would be possible to request input of the email address or physical address of the user, or of his name and/or credit card number, or the like. Yet further, if a computer is being used as the user terminal 12 and access is being performed via a web page, then it would be possible to request input of the newly registered ID and password for accessing the purchase page, or of the address of the user, his name or credit card number, or the like. And, if the registration of this user 2 has proceeded normally, the goods purchase control section 45 informs the user terminal 12 of the user ID which has been allocated to this user 2, and simultaneously performs registration in the user database 44 of the corresponding ID and of the information which has been input from the user terminal 12.

When the user authentication has been performed normally in this manner, the goods purchase control section 45 transmits the details of the order to the user terminal 12 and invites the user 2 to check these order details (in a step S75). In concrete terms, the information about the CD which the user 2 has ordered is presented to the user 2 a second time and he is requested to check it. If the user 2 approves the details of the order, he operates the user terminal 12 and transmits acknowledgement information to the information search server 15. When the acknowledgement information is received from the user 2, the goods purchase control section 45, along with notifying the user terminal 12 that the order has been received, also (in a step S76) supplies the information which was presented to the user 2 to the information provider 1 (or alternatively to a CD sales company which is not shown in the figures), so as to issue an order for the CD. Thereafter, when for example the CD sales company has received the order, it transmits to the information search server 15a information consisting of an acknowledgement of the order and of the anticipated date for dispatch of the goods, and the goods purchase control section 45 receives this information and (in a step S77) notifies the user terminal 12 of the completion of the order and of the anticipated date for dispatch thereof. This completes the goods purchase procedure.

Moreover, if it is desired to enhance the security of this service, or to charge for it, it would also be acceptable to perform user management by additionally providing a user authentication device for performing user registration and authentication. It is possible to implement the structure of such a user authentication device by utilizing per se known art, and this structure is not particularly limited; any such device will be acceptable, provided that it is able to perform user registration and authentication.

Embodiment 4

In this fourth preferred embodiment, a concrete example of an information search server which is endowed with the function of obtaining a price from the user will be explained. The information search server of this fourth preferred embodiment is one which calculates a price for the service which is provided to the user, and presents this to the user as a utilization fee.

Figure 22:
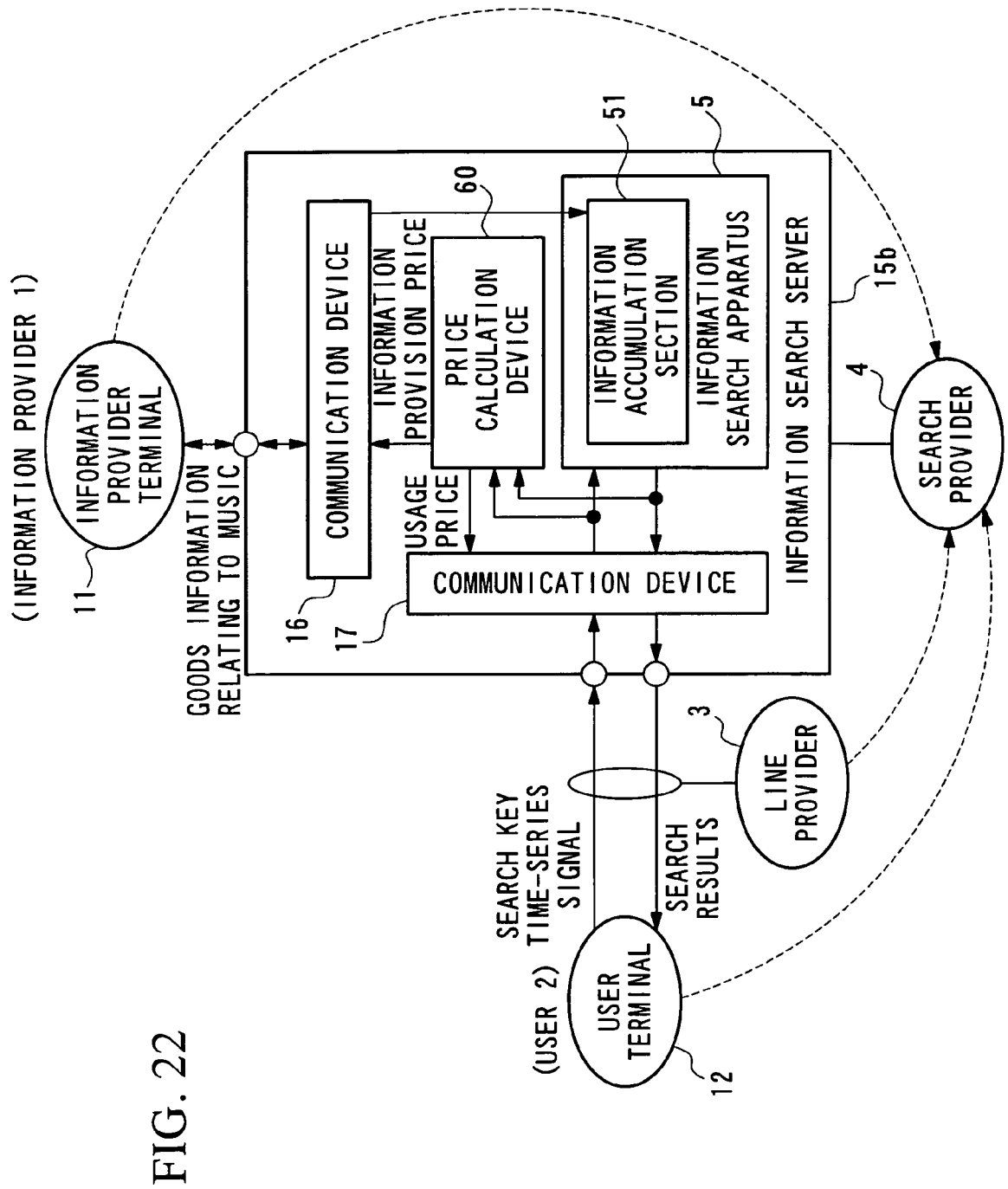
FIG. 22 is a block diagram showing the structure of an information search system according to a fourth preferred embodiment of the present invention.

FIG. 22 is a block diagram showing the structure of the information search system according to this fourth preferred embodiment of the present invention. In this figure, to structural elements which are the same as ones shown in FIG. 1, the same reference symbols are affixed. Moreover, since in this fourth preferred embodiment as well as in a fifth preferred embodiment of the present invention which will be described subsequently the only difference is that the method of price calculation and the subject from whom the price is levied are different, in FIG. 22 a structure which is capable of implementing both of these preferred embodiments is shown. The information search server 15b of this fourth preferred embodiment differs from the information search server 15 shown in FIG. 1, in that a price calculation device 60 is additionally included. This price calculation device 60 captures the search key time-series signal (or the search key time-series signal feature data) sent from the user terminal 12 to the information search server 15b and the search results sent from the information search server 15b to the user terminal 12, and calculates the appropriate price.

Figure 23:
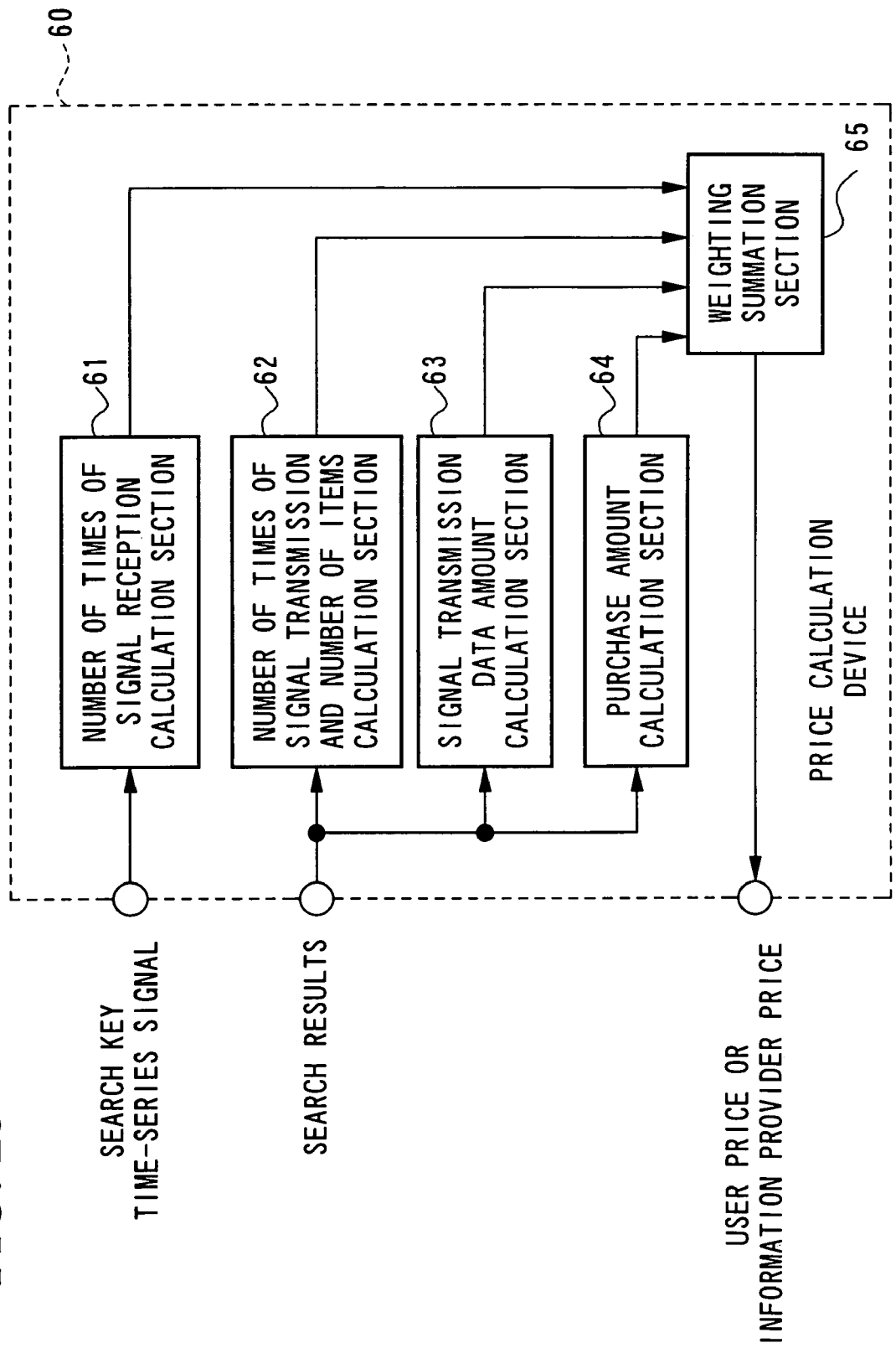
FIG. 23 is a block diagram showing the structure of a price calculation device in this fourth preferred embodiment.

FIG. 23 is a block diagram showing the concrete structure of the price calculation device 60 of this fourth preferred embodiment. Referring to this figure, a number of times of signal reception calculation section 61 counts the number of times the information search server 15b has received time-series data (or time-series signal feature data) sent from the user terminal 12, and outputs this number of reception times. A number of times of signal transmission and number of items calculation section 62 counts both the number of times the information search server 15b has transmitted search results to the user terminal 12 and the number of items transmitted, and outputs this number of transmission times and number of items transmitted. It should be noted that the value of the number of items transmitted is greater than or equal to the number of transmission times, since it may happen that a plurality of items of accompanying information are obtained in a single search. A signal transmission data amount calculation section 63 calculates the number of bytes of search results that have been transmitted from the information search server 15b to the user terminal 12, and outputs this amount of transmitted data. If the user 2 has purchased goods, a purchase amount calculation section 64 calculates the total purchase price and the total number of items purchased, and outputs them. And a weighting summation section 65 performs individual weighting for each of the items of data output from the four types of calculation section 61 through 64, calculates the sum of the values obtained by weighting, and outputs the result as a price (in this fourth preferred embodiment of the present invention, a usage price).

Various methods may be conceived of for calculation of the usage price by the price calculation device 60, and as one example thereof there is the method of calculation from the number of times search results have been transmitted to the user, the number of items transmitted, and the amount of transmitted data.

Figure 24:
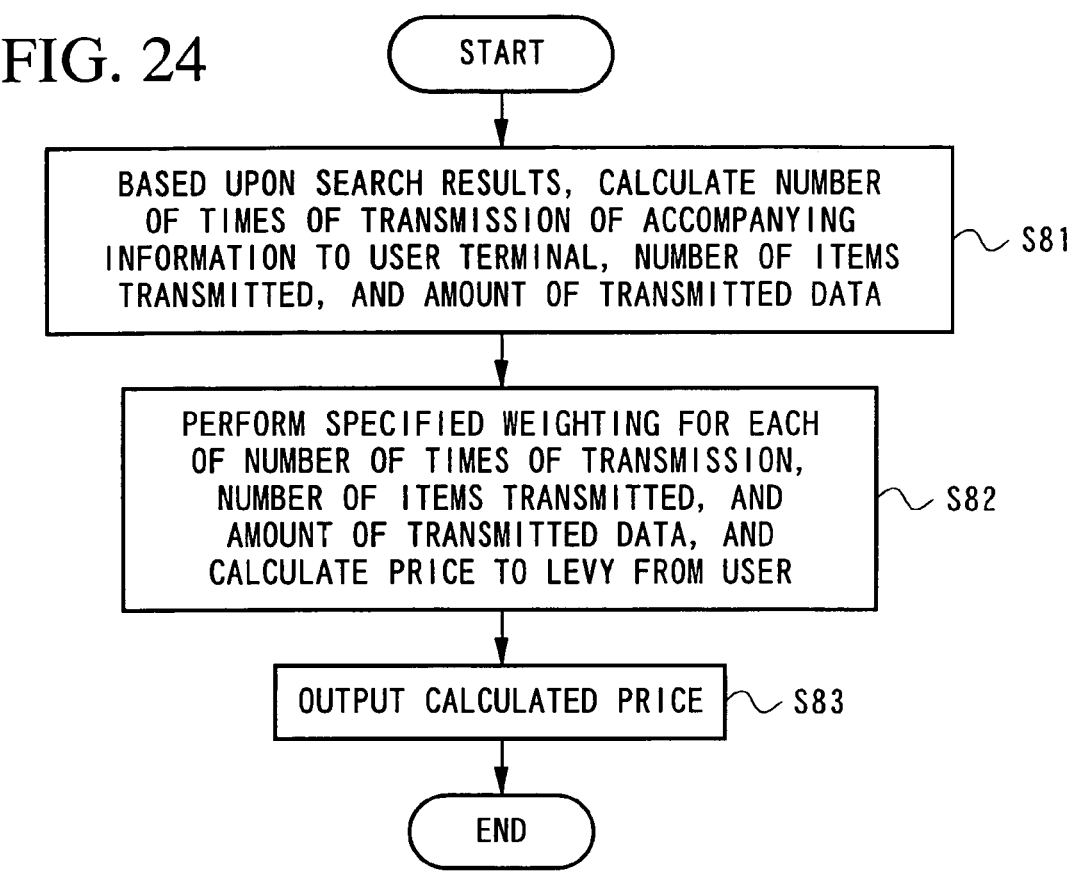
FIG. 24 is a flow chart showing a usage price calculation procedure for this fourth preferred embodiment.

FIG. 24 is a flow chart showing the calculation procedure for the usage price performed by the price calculation device 60 of this fourth preferred embodiment. Via the user terminal 12, the user performs an information search by utilizing the information search server 15b, for example as explained with reference to the first preferred embodiment. In parallel with this information search (in a step S81) the number of times of signal transmission and number of items calculation section 62 and the signal transmission data amount calculation section 63 input the search results which are outputted from the information search server 15b, derive the number of times of transmission of search results to the user terminal 12, the number of items transmitted, and the amount of data transmitted, and output these items of information to the weighting summation section 65. Based upon this information the weighting summation section 65 calculates (in a step S82) the usage price and transmits this price to the user terminal 12, which presents it to the user 2 (in a step S83).

Embodiment 5

For this fifth preferred embodiment of the present invention, a concrete example will be described of an information search server which charges the information provider, thus being endowed with the function of obtaining an information provision price from the information provider. The information search server of this fifth preferred embodiment is made so as to calculate a price for the service provided to the user, and so as to perform presentation of a charge to the information provider as a price for information provision or for sales promotion.

The structure of the information search system according to this fifth preferred embodiment and the structure of the price calculation device are the same as in the fourth preferred embodiment, described above. Further, various methods may be conceived of for calculation of the information provision price by the price calculation device 60 (refer to FIG. 22). As one such, there is the method of calculation from the number of times of transmission of purchase information to the user terminal 12 and the purchase price of the goods.

Figure 25:
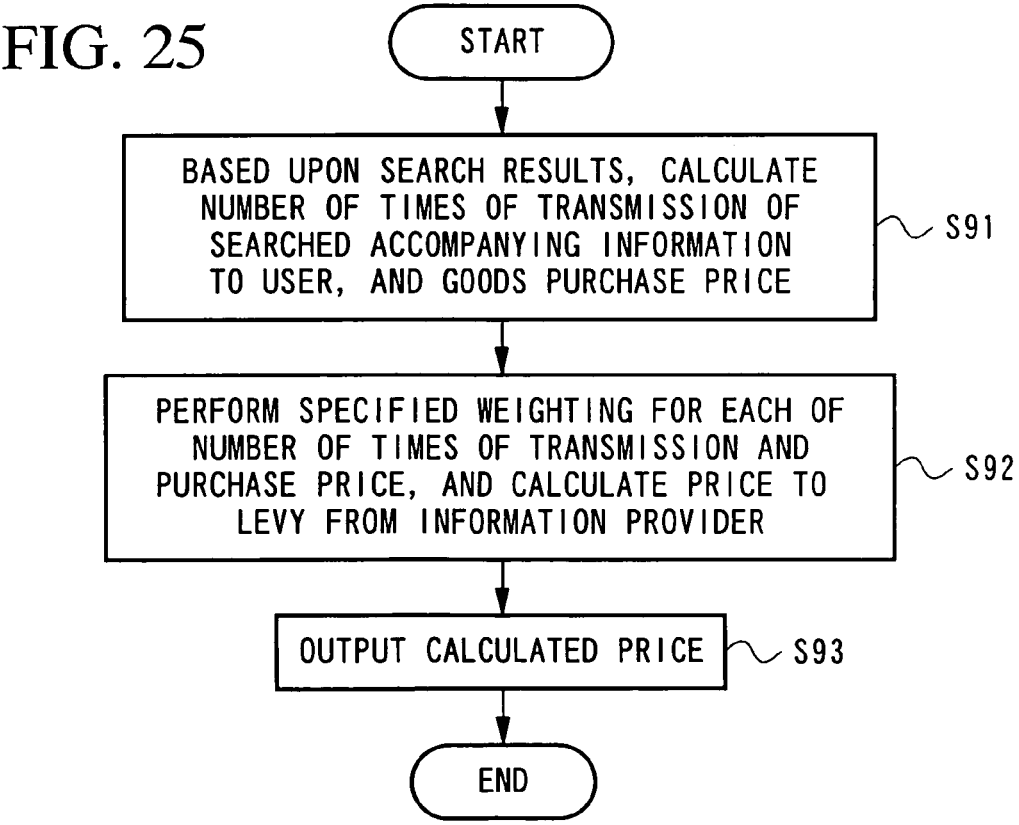
FIG. 25 is a flow chart showing an information provision price calculation procedure for this fourth preferred embodiment.

FIG. 25 is a flow chart showing the calculation procedure for the information provision price performed by the price calculation device 60 in this fifth preferred embodiment. The user 2 operates the user terminal 12 to perform a search for information utilizing the information search server 15*b* as explained above with reference to, for example, the first preferred embodiment. In parallel with this information search (in a step S91) the purchase amount calculation section 64 (refer to FIG. 23) inputs the search results which are outputted from the information search server 15*b*, derives the total purchase price of the goods which the user 2 has purchased and the total number of items purchased, and outputs this information to the weighting summation section 65. Based upon this, the weighting summation section 65 calculates (in a step S92) the information provision price and transmits it to the information provider terminal 11, which (in a step S93) presents this information provision price to the information provider 1.

SUMMARY

Since as explained above it is possible, according to the various preferred embodiments of the present invention, to search for accompanying information which has been accumulated using as search key a fragment of concrete time-series signal such as a snatch of sound or a video image clip or the like, thereby it is possible both easily and moreover quickly to search for and provide (1) information relating to a piece of music of which the name of the tune is not known; (2) information relating to a movie of which the title is not known; and (3) detailed goods information etc. for goods based upon a fragment of a commercial message. Accordingly, for example, by enabling a user to search a database in which there is accumulated information which has been determined in advance such as goods information related to music which is recorded upon a CD and information about the singer the like by using a fragment of concrete media information as search key, it is possible to select the information which is of interest to the user and to present it to him, to obtain a price for this information provision from the user, and to obtain a price for sales promotion from the information provider.

Because of this, it is possible to generate at least one of (1) a flow of money from the user 2 to the search provider 4 as a price for presenting helpful information, (b) a flow of money from the information provider 1 to the search provider 4 as a price for the benefits of advertising and sales promotion.

Moreover, the present invention should also be understood to include the case in which the information provider 1 or the line provider 3 itself offers the search function. Furthermore, the database need not be one which is implemented upon only one computer; it also includes the case of a distributed type database of the kind in which a number of computers which are connected together into a computer network such as, for example, the Internet or the like accumulate data in a distributed manner.

Yet further, the subject of searching of the present invention is not limited to being a sound signal such as music or the like; it is also possible easily and quickly to search for and deliver information related to a video image signal such as a movie or a commercial message or the like, from a piece of time-series data which is a clip of information related thereto. Moreover, based upon clips of both a sound signal and a video image signal, it would also be acceptable to perform simultaneous searching through contents which include both this sound signal and this video image signal.

The functions with which the various internal parts of the above described information search server are endowed could, in practice, be implemented upon any computer. Because of this, it would also be acceptable to implement the function of any of the preferred embodiments of the present invention by recording upon a storage medium which can be read by a computer a program for executing the operation of the preferred embodiment of the present invention by a computer, and by reading into a computer this program which is recorded upon this storage medium and executing it. The term "computer system" is meant to include the OS (operating system) and the peripheral hardware devices and the like. Furthermore, the term "computer" should be considered as including the environment (or its display environment) offered by a home page, if advantage is taken of the WWW (World Wide Web) system. It would also be possible for the above described program to be a so called differential program which implements only a portion of the above described functions, and which is combined with a program which is already recorded in a computer so as to result in a combination program which implements the functions in full. The term "storage medium which can be read by a computer" means any recording device such as a flexible disk, an opto-magnetic disk, a removable medium such as a ROM (Read Only Memory) or a CD-ROM or the like, or a hard disk or the like housed within a computer system. Moreover, the term "storage medium which can be read by a computer" also includes a medium which maintains the program dynamically even for a short period of time, such as a communication line when it is transmitting the program via a network such as the Internet or the like or a communication line such as a telephone line, or a medium which maintains the program for a certain time, such as volatile memory within a computer system which functions as a server or a client.

Although with the various preferred embodiments described above the user terminal, the information search server, and the information provider terminal were connected together via communication lines, it would also be acceptable for them to be kept in mutual communication via any type of transmission medium capable of transmitting information, such as radio waves (wireless), cables (wires), or a computer network or the like. Furthermore, the same goes for the time-series data obtained by the user.

Any combination of the various features of any of the above described preferred embodiments or their variations likewise is to be considered as coming within the scope of the present invention. For example, a combination of the first or the second variant example of the first preferred embodiment and any of the first through the third variant examples of the second preferred embodiment would be acceptable. Yet further, it would also be possible to construct a combination of the second variant example of the first preferred embodiment (FIG. 9) and the second variant example of the second preferred embodiment (FIG. 15) so that according to FIG. 17 the search key time-series signal input section and the information update section had the data discrimination section and the feature calculation section in common.

What is claimed is:

1. An information search system comprising:
a terminal of an information provider having a processor;
a terminal of a user having a processor; and
an information search server having a processor, the processor of the information search server comprising:
  an information accumulation section which accumulates in advance accompanying information related to reference time-series data;
  a time-series signal feature accumulation section which accumulates in advance reference time-series signal feature data, said reference time-series signal feature data being associated with respective accompanying information related to the reference time-series data;

a search key input section configured to receive a piece of search key time-series data from said terminal of said user as a search key;

a feature calculation section configured to generate search key time-series signal feature data in a form of a multi-dimensional feature vector based on said piece of said search key time-series data, wherein each element of said multi-dimensional feature vector represents an average value of a corresponding one of a plurality of portions which are obtained by dividing said piece of search key time-series data into the plurality of portions;

a feature collating section configured to perform collation between said search key time-series signal feature data and said reference time-series signal feature data to determine a similar portion in said reference time-series signal feature data, and searches out collating reference time-series signal feature data which includes the similar portion;

a search information selection section configured to select, from said information accumulation section, accompanying information based upon the collating reference time-series signal feature data;

an information presentation section configured to output, as a search result, said accompanying information which is selected by said search information selection section; and an information update section which, when reference time-series signal feature data, which has been obtained by feature calculation of reference time-series data, and accompanying information related to said reference time-series signal feature data have been received from the terminal of the information provider, performs addition to the reference time-series signal feature data which is accumulated in said time-series signal feature accumulation section and the accompanying information which is accumulated in said information accumulation section, according to said received reference time-series signal feature data and accompanying information, and which, when a signal for commanding the deletion of reference time-series signal feature data and accompanying information, and data for specifying the reference time-series signal feature data and the accompanying information which are to be deleted have been received from said terminal of said information provider, performs deletion of said reference time-series signal feature data and said accompanying information which are to be deleted from said time-series signal feature accumulation section and said information accumulation section, respectively, wherein the processor of said information search server performs updating of said accompanying information which is presented to said user.

2. The information search system according to claim 1, wherein the processor of the information search server further comprises a data discrimination section which discriminates the type of data which has been input to said search key input section, and, if said input data is said search key time-series signal feature data, outputs said search key time-series signal feature data to said feature collating section; and said apparatus performs searching, not via said feature calculation section.

3. An information search apparatus system comprising:
a terminal of an information provider having a processor;
a terminal of a user having a processor; and
an information search server having a processor, the processor of the information search server comprising:
an information accumulation section which accumulates in advance accompanying information related to reference time-series data;
a time-series signal feature accumulation section which accumulates in advance reference time-series signal feature data, said reference time-series signal feature data being associated with respective accompanying information related to the reference time-series data;
a search key input section configured to receive search key time-series signal feature data in a form of a multi-dimensional feature vector, wherein each element of said multi-dimensional feature vector represents an average value of a portion of search key time-series data, said portion being obtained by dividing said search key time-series data into a plurality of portions;
a feature collating section configured to perform collation between said search key time-series signal feature data and said reference time-series signal feature data to determine a similar portion in said reference time-series signal feature data, and searches out collating reference time-series signal feature data which includes the similar portion;
a search information selection section configured to select, from said information accumulation section, accompanying information based upon the collating reference time-series signal feature data;
an information presentation section configured to output, as a search result, said accompanying information which is selected by said search information selection section; and
an information update section which, when reference time-series signal feature data, which has been obtained by feature calculation of reference time-series data, and accompanying information related to said reference time-series signal feature data have been received from the terminal of the information provider, performs addition to the reference time-series signal feature data which is accumulated in said time-series signal feature accumulation section and the accompanying information which is accumulated in said information accumulation section, according to said received reference time-series signal feature data and accompanying information, and which, when a signal for commanding the deletion of reference time-series signal feature data and accompanying information, and data for specifying the reference time-series signal feature data and the accompanying information which are to be deleted have been received from said terminal of said information provider, performs deletion of said reference time-series signal feature data and said accompanying information which are to be deleted from said time-series signal feature accumulation section and said information accumulation section, respectively,
wherein the processor of said information search server performs updating of said accompanying information which is presented to said user.

4. The information search system according to claim 1, wherein the information search server further comprises:
a communication device which performs transmission and reception of information between said terminal of said user and said information search server; and wherein
based upon search key time-series data which has been input from said terminal of said user, presents to said user accompanying information related to said reference time-series data which includes a similar portion as the search key time-series data which has been input.

5. The information search server system according to claim 4, wherein said information accumulation section accumulates accompanying information including goods information related to goods; and the information search server further comprises a goods purchase device which comprises: a purchase information reception section which receives goods purchase information which is transmitted from said terminal of said user; a purchase information transmission section which transmits said goods purchase information which has been received by said purchase information reception section to said terminal of said information provider; and wherein information is presented to said user for purchasing said goods based upon said search results transmitted by said information search server.

6. The information search system according to claim 5, wherein the information search server further comprises a user registration and authentication section which performs registration and authentication of said user, and wherein said goods purchase device outputs information related to purchase of said goods only to a terminal of a user whose registration is approved, based upon the registration and authentication results by said user registration and authentication section.

7. The information search system according to claim 4, wherein the information search server further comprises a usage price calculation device which calculates a usage price according to the amount by which said terminal of said user has utilized said information search server, and which presents said usage price to said terminal of said user in order to levy said usage price from said user.

8. The information search system according to claim 7, wherein said usage price calculation device calculates said usage price based upon at least one of the number of times of transmission of data from said terminal of said user, and the amount of said transmitted data.

9. The information search system according to claim 4, wherein the information search server further comprises an information provision price calculation device which calculates a price for information provision to said information provider according to the amount by which said terminal of said user has utilized said information search server, and which presents said information provision price to said information provider in order to levy said information provision price from said information provider.

10. The information search system according to claim 9, wherein said information provision price calculation device calculates said information provision price based upon at least one of the number of times of transmission of purchase information to said terminal of said user, and goods purchase price.

11. An information search method used in an information search system which includes an information search apparatus, a terminal of an information provider, and a terminal of a user, the information search method comprising:

an information accumulation step of accumulating in advance accompanying information related to reference time-series data;

a time-series signal feature accumulation step of accumulating in advance reference time-series signal feature data, said reference time-series signal feature data being associated with the respective accompanying information related to the reference time-series data;

a search key input step of receiving a piece of search key time-series data from said terminal of said user as a search key;

a feature calculation step of generating search key time-series signal feature data in a form of a multi-dimensional feature vector based on said piece of said search key time-series data, wherein each element of said multi-dimensional feature vector represents an average value of a corresponding one of a plurality of portions which are obtained by dividing said piece of search key time-series data into the plurality of portions;

a feature collation step of performing collation between said search key time-series signal feature data and said reference time-series signal feature data to determine a similar portion in said reference time-series signal feature data, and searching out collating reference time-series signal feature data which includes the similar portion;

a search information selection step of selecting said accompanying information which has been accumulated in advance, based upon the collating reference time-series signal feature data;

an information presentation step of outputting, as a search result, the accompanying information which has been selected by said search information selection step; and an information updating step which, when reference time-series signal feature data, which has been obtained by feature calculation of reference time-series data, and accompanying information related to said reference time-series signal feature data have been received from said terminal of said information provider, performs addition to said accumulated reference time-series signal feature data and said accumulated accompanying information, according to said received reference time-series signal feature data and said accompanying information; and which, when a signal for commanding the deletion of reference time-series signal feature data and accompanying information, and data for specifying the reference time-series signal feature data and the accompanying information which are to be deleted have been received from said terminal of said information provider, performs deletion of said reference time-series signal feature data and said accompanying information which are to be deleted from said accumulated reference time-series signal feature data and said accumulated accompanying information, respectively, wherein updating of said accompanying information which is presented to said user is performed.

12. The information search method according to claim 11, further comprising a data discrimination step which discriminates the type of data which have been input by said search key input step, and, if said input data is said search key time-series signal feature data, outputs said search key time-series signal feature data to said feature collation step, and searching is performed without performing said feature calculation step.

13. An information search method used in an information search system which includes an information search apparatus, a terminal of an information provider, and a terminal of a user, the information search method comprising:

an information accumulation step of accumulating in advance accompanying information related to reference time-series data;

a time-series signal feature accumulation step of accumulating in advance reference time-series signal feature data, said reference time-series signal feature data being associated with respective accompanying information related to the reference time-series data;

a search key input step of receiving search key time-series signal feature data in a form of a multi-dimensional feature vector, wherein each element of said multi-dimensional feature vector represents an average value of a portion of search key time-series data, said portion being obtained by dividing said search key time-series data into a plurality of portions;

a feature collation step of performing collation between said search key time-series signal feature data and said reference time-series signal feature data to determine a similar portion in said reference time-series signal feature data, and searching out collating reference time-series signal feature data which includes the similar portion;

a search information selection step of selecting said accompanying information which has been accumulated in advance, based upon the collating reference time-series signal feature data;

an information presentation step of outputting, as a search result, the accompanying information which has been selected by said search information selection step; and an information updating step which, when reference time-series signal feature data, which has been obtained by feature calculation of reference time-series data, and accompanying information related to said reference time-series signal feature data have been received from said terminal of said information provider, performs addition to said accumulated reference time-series signal feature data and said accumulated accompanying information, according to said received reference time-series signal feature data and said accompanying information; and which, when a signal for commanding the deletion of reference time-series signal feature data and accompanying information, and data for specifying the reference time-series signal feature data and the accompanying information which are to be deleted have been received from said terminal of said information provider, performs deletion of said reference time-series signal feature data and said accompanying information which are to be deleted from said accumulated reference time-series signal feature data and said accumulated accompanying information, respectively, wherein updating of said accompanying information which is presented to said user is performed.

14. A search service provision method which performs the information search method according to claim 11, based upon search key time-series data which has been input from said terminal of said user, and which presents to said user accompanying information related to said reference time-series data which includes a similar portion as the search key time-series data which has been input.

15. The search service provision method according to claim 14, wherein said accompanying information includes goods information related to goods, and further comprising a goods purchase step which comprises:

a purchase information reception step which receives goods purchase information which is transmitted from said terminal of said user;

a purchase information transmission step which transmits said goods purchase information which has been received by said purchase information reception step to said terminal of said information provider;

and wherein information is presented to said user for purchasing said goods based upon said search results transmitted by said information search method.

16. The search service provision method according to claim 15, further comprising a user registration and authentication step which performs registration and authentication of said user, and wherein said goods purchase step outputs information related to purchase of said goods only to a terminal of a user whose registration is approved, based upon the registration and authentication results by said user registration and authentication step.

17. The search service provision method according to claim 14, further comprising a usage price calculation step which calculates a usage price according to the amount by which said terminal of said user has utilized information search in accordance with said information search method, and which presents said usage price to said terminal of said user in order to levy said usage price from said user.

18. The search service provision method according to claim 17, wherein said usage price calculation step calculates said usage price based upon at least one of the number of times of transmission of data from said terminal of said user, and the amount of said transmitted data.

19. The search service provision method according to claim 14, further comprising an information provision price calculation step which calculates a price for information provision to said information provider according to the amount by which said terminal of said user has utilized information search in accordance with said information search method, and which presents said information provision price to said information provider in order to levy said information provision price from said information provider.

20. The search service provision method according to claim 19, wherein, in said information provision price calculation step, said information provision price is calculated based upon at least one of the number of times of transmission of purchase information to said terminal of said user, and goods purchase price.

21. The information search method according to claim 11, wherein:

said accompanying information is utilized tune information related to a tune which is utilized in a program which is broadcast via radio waves, a cable, or a computer network;

said reference time-series data is clip information which is a portion of said program or of a commercial which is presented during an interval of said program; and said utilized tune information related to the search key time-series data which has been input from said terminal of said user is transmitted to said terminal of said user.

22. The information search method according to claim 11, wherein:

said accompanying information is goods information related to goods which are offered by a provider of a program which is broadcast via radio waves, a cable, or a computer network;

said reference time-series data is clip information which is a portion of said program or of a commercial which is presented during an interval of said program; and said goods information related to the search key time-series data which has been input from said terminal of said user is transmitted to said terminal of said user.

23. The information search method according to claim 11, wherein:

said accompanying information is goods information related to a CD or a video;

said reference time-series data is clip information for music which is recorded upon said CD or for sound or a video image which is recorded upon said video; and said goods information related to the search key time-series data which has been input from said terminal of said user is transmitted to said terminal of said user.

24. The information search method according to claim 11, wherein said search key time-series data includes a sound signal.

25. The information search method according to claim 11, wherein said search key time-series data includes a video image signal.

26. The information search method according to claim 11, wherein at least one of said search key time-series data or said search key time-series signal feature data is sent from a portable telephone which is said terminal of said user.

27. A program storage medium readable by a machine, tangibly embodying a program of instructions executed by the machine to perform a method in an information search system which includes an information search apparatus, a terminal of an information provider, and a terminal of a user, the method comprising:

an information accumulation step of accumulating in advance accompanying information related to reference time-series data;

a time-series signal feature accumulation step of accumulating in advance reference time-series signal feature data, said reference time-series signal feature data being associated with the respective accompanying information related to the reference time-series data;

a search key input step of receiving a piece of search key time-series data from said terminal of said user as a search key;

a feature calculation step of generating search key time-series signal feature data in a form of a multi-dimensional feature vector based on said piece of said search key time-series data, wherein each element of said multi-dimensional feature vector represents an average value of a corresponding one of a plurality of portions which are obtained by dividing said piece of search key time-series data into the plurality of portions;

a feature collation step of performing collation between said search key time-series signal feature data and said reference time-series signal feature data to determine a similar portion in said reference time-series signal feature data, and searching out collating reference time-series signal feature data which includes the similar portion;

a search information selection step of selecting said accompanying information which is accumulated in advance based upon the collating reference time-series signal feature data;

an information presentation step of outputting, as a search result, said accompanying information which is selected by said search information selection step; and an information updating step which, when reference time-series signal feature data, which has been obtained by feature calculation of reference time-series data, and accompanying information related to said reference time-series signal feature data have been received from said terminal of said information provider, performs addition to said accumulated reference time-series signal feature data and said accumulated accompanying information, according to said received reference time-series signal feature data and said accompanying information; and which, when a signal for commanding the deletion of reference time-series signal feature data and accompanying information, and data for specifying the reference time-series signal feature data and the accompanying information which are to be deleted have been received from said terminal of said information provider, performs deletion of said reference time-series signal feature data and said accompanying information which are to be deleted from said accumulated reference time-series signal feature data and said accumulated accompanying information, respectively, wherein updating of said accompanying information which is presented to said user is performed.

28. A program storage medium readable by a machine, tangibly embodying a program of instructions executed by the machine to perform a method in an information search system which includes an information search apparatus, a terminal of an information provider, and a terminal of a user, the method comprising:

an information accumulation step of accumulating in advance accompanying information related to reference time-series data;

a time-series signal feature accumulation step of accumulating in advance reference time-series signal feature data, said reference time-series signal feature data being associated with respective accompanying information related to the reference time-series data;

a search key input step of receiving search key time-series signal feature data in a form of a multi-dimensional feature vector, wherein each element of said multi-dimensional feature vector represents an average value of a portion of search key time-series data, said portion being obtained by dividing said search key time-series data into a plurality of portions;

a feature collation step of performing collation between said search key time-series signal feature data and said reference time-series signal feature data to determine a similar portion in said reference time-series signal feature data, and searching out collating reference time-series signal feature data which includes the similar portion;

a search information selection step of selecting said accompanying information which has been accumulated in advance, based on the collating reference time-series signal feature data;

an information presentation step of outputting, as a search result, the accompanying information which has been selected by said search information selection step; and an information updating step which, when reference time-series signal feature data, which has been obtained by feature calculation of reference time-series data, and accompanying information related to said reference time-series signal feature data have been received from said terminal of said information provider, performs addition to said accumulated reference time-series signal feature data and said accumulated accompanying information, according to said received reference time-series signal feature data and said accompanying information; and which, when a signal for commanding the deletion of reference time-series signal feature data and accompanying information, and data for specifying the reference time-series signal feature data and the accompanying information which are to be deleted have been received from said terminal of said information provider, performs deletion of said reference time-series signal feature data and said accompanying information which are to be deleted from said accumulated reference time-series signal feature data and said accumulated accompanying information, respectively, wherein updating of said accompanying information which is presented to said user is performed.

29. The information search method according to claim 11, wherein said search key time-series data input from said terminal of said user is a fragment of time-series data which said user has encountered and is captured with said terminal of said user.

30. The information search method according to claim 11, wherein said search key time-series data from said terminal of said user is input via the Internet using a web page or a home page.

31. The information search method according to claim 30, wherein said search key time-series data is input in accordance with an Internet protocol.

32. The information search method according to claim 11, wherein said accompanying information accumulated in advance is input from said terminal of said information provider via the Internet.

33. The information search method according to claim 11, wherein said information presentation step displays said accompanying information on a web page or a home page via the Internet, or transmits said accompanying information using text-based email or html-based email.

34. The information search method according to claim 11, wherein said accompanying information includes at least one of the title of contents, the name of an artist, and information relating to a CD, a video tape, or a DVD on which contents are recorded.

35. The information search system according to claim 1, wherein said accompanying information output from said information presentation section is specific accompanying information associated with the searched-out collating reference time-series signal feature data.

36. The information search system according to claim 3, wherein said accompanying information output from said information presentation section is specific accompanying information associated with the searched-out collating reference time-series signal feature data.

37. The information search method according to claim 11, wherein said accompanying information output in said information presentation step is specific accompanying information associated with the searched-out collating reference time-series signal feature data.

38. The information search method according to claim 13, wherein said accompanying information output in said information presentation step is specific accompanying information associated with the searched-out collating reference time-series signal feature data.

39. The program storage medium according to claim 27, wherein said accompanying information output in said information presentation step is specific accompanying information associated with the searched-out collating reference time-series signal feature data.

40. The program storage medium according to claim 28, wherein said accompanying information output in said information presentation step is specific accompanying information associated with the searched-out collating reference time-series signal feature data.

41. The information search system according to claim 1, wherein said accompanying information accumulated in said information accumulation section and said reference time-series signal feature data accumulated in the time-series signal feature accumulation section are received from said information provider.

42. The information search system according to claim 3, wherein said accompanying information accumulated in said information accumulation section and said reference time-series signal feature data accumulated in the time-series signal feature accumulation section are received from said information provider.

43. The information search method according to claim 11, wherein said accompanying information accumulated in said information accumulation step and said reference time-series signal feature data accumulated in the time-series signal feature accumulation step are received from said information provider.

44. The information search method according to claim 13, wherein said accompanying information accumulated in said information accumulation step and said reference time-series signal feature data accumulated in the time-series signal feature accumulation step are received from said information provider.

* * * * *